United States Patent
Fujita et al.

(10) Patent No.: US 8,576,681 B2
(45) Date of Patent: *Nov. 5, 2013

(54) OPTICAL INFORMATION RECORDING MEDIUM, OPTICAL INFORMATION RECORDING APPARATUS AND OPTICAL INFORMATION RECORDING METHOD

(75) Inventors: Goro Fujita, Kanagawa (JP); Takashi Iwamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 13/343,873

(22) Filed: Jan. 5, 2012

(65) Prior Publication Data

US 2012/0099411 A1 Apr. 26, 2012

Related U.S. Application Data

(63) Continuation of application No. 12/544,360, filed on Aug. 20, 2009, now Pat. No. 8,102,742.

(30) Foreign Application Priority Data

Aug. 22, 2008 (JP) ................. 2008-214402

(51) Int. Cl.
*G11B 7/00* (2006.01)

(52) U.S. Cl.
USPC ............ 369/47.49; 369/59.11; 369/59.12; 369/101; 369/103; 430/270.11

(58) Field of Classification Search
None
See application file for complete search history.

(56) References Cited

U.S. PATENT DOCUMENTS

| | | | |
|---|---|---|---|
| 7,193,953 | B2 | 3/2007 | Kim |
| 7,706,233 | B2 | 4/2010 | Horimai et al. |
| 7,881,178 | B2 | 2/2011 | Oouchida |
| 7,936,657 | B2 | 5/2011 | Fujita et al. |
| 7,948,853 | B2 | 5/2011 | Fujita |
| 2006/0246375 | A1 | 11/2006 | Shiono et al. |
| 2007/0217320 | A1 | 9/2007 | Meinders et al. |
| 2009/147652 | A1 | 6/2009 | Fujita |
| 2009/0168632 | A1 | 7/2009 | Miyamoto et al. |
| 2009/0285059 | A1 | 11/2009 | Fujita et al. |
| 2010/0027403 | A1 | 2/2010 | Fujita et al. |
| 2010/0220573 | A1 | 9/2010 | Aoki |

FOREIGN PATENT DOCUMENTS

| | | |
|---|---|---|
| JP | 62-020147 | 1/1987 |
| JP | 04-321934 | 11/1992 |
| JP | 06-028672 | 2/1994 |
| JP | 10-064104 | 3/1998 |
| JP | 10-308033 | 11/1998 |
| JP | 11-296875 | 10/1999 |

(Continued)

OTHER PUBLICATIONS

Japanese Office Action issued Jul. 15, 2010 in connection with Japanese Application No. 2008-214402.

(Continued)

*Primary Examiner* — Joseph Haley
(74) *Attorney, Agent, or Firm* — Wolf, Greenfield & Sacks, P.C.

(57) ABSTRACT

An optical information recording medium includes a recording layer in which a track is formed, the track having recording marks linearly arranged thereon. Each recording mark has a dimension corresponding to a reference mark length, which serves as a reference, in a track direction along which the track extends, the dimension being smaller than dimensions of the recording mark in two directions perpendicular to the track direction.

13 Claims, 17 Drawing Sheets

(56) References Cited

FOREIGN PATENT DOCUMENTS

| | | |
|---|---|---|
| JP | 11-328724 | 11/1999 |
| JP | 2000-163795 | 6/2000 |
| JP | 2001-325748 | 11/2001 |
| JP | 2002-334433 | 11/2002 |
| JP | 2003-077157 | 3/2003 |
| JP | 2003-132586 | 5/2003 |
| JP | 2003-217142 | 7/2003 |
| JP | 2003-296936 A | 10/2003 |
| JP | 2004-139638 A | 5/2004 |
| JP | 2005-37658 | 2/2005 |
| JP | 2007-042149 A | 2/2007 |
| JP | 2007-115368 A | 5/2007 |
| JP | 2007-179676 A | 7/2007 |
| JP | 2007-220206 A | 8/2007 |
| JP | 2007-287245 A | 11/2007 |
| JP | 2008-017433 A | 1/2008 |
| JP | 2008-071433 A | 3/2008 |
| WO | WO 2006/111972 A2 | 10/2006 |
| WO | WO 2007/135827 A1 | 11/2007 |

OTHER PUBLICATIONS

Japanese Office Action issued Apr. 22, 2010 in connection with Japanese Application No. 2008-198447.

Japanese Office Action issued Mar. 25, 2010 in connection with Japanese Application No. 2008-129734.

Japanese Office Action issued Jan. 28, 2010 in connection with Japanese Application No. 2007-341371.

Japanese Office Action issued Oct. 15, 2009 in connection with Japanese Application No. 2007-341371.

Japanese Office Action issued Mar. 24, 2011 in connection with Japanese Application No. 2008-214402.

Toriumi et al., Reflection confocal microscope readout system for three-dimensional photochromic optical data storage. Opt Lett. Dec. 15, 1998; 23(24):1924-6.

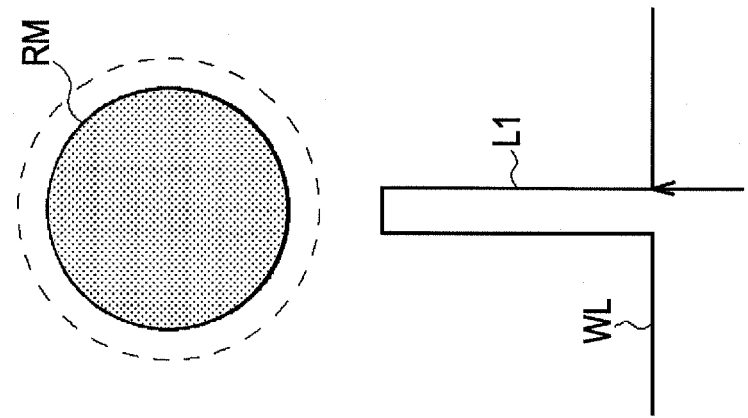
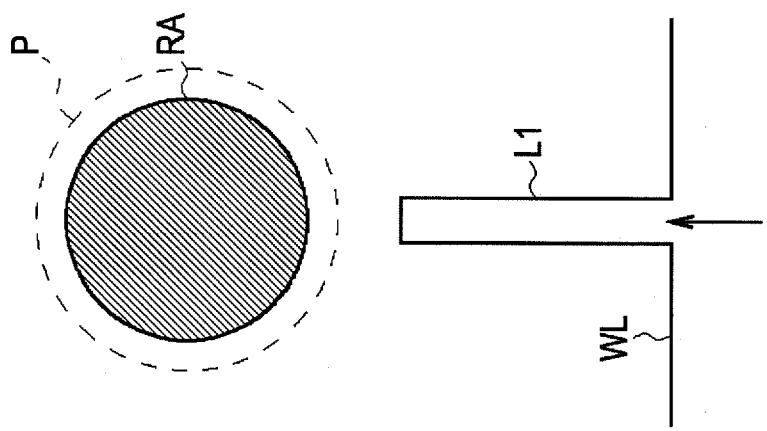
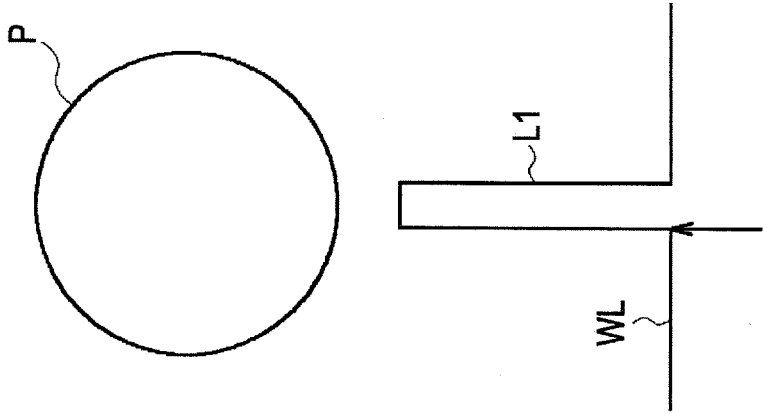

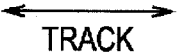
TRACK DIRECTION

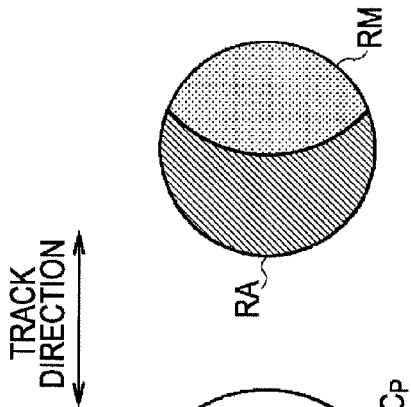 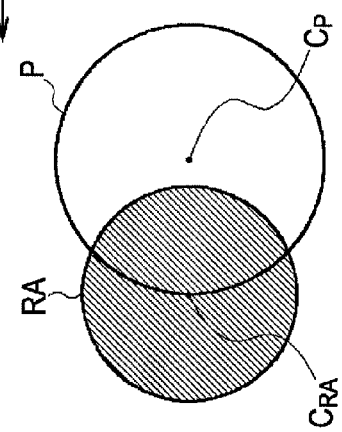 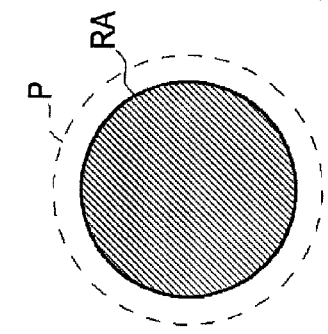 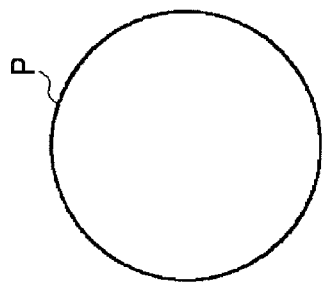
FIG. 5A  FIG. 5B  FIG. 5C  FIG. 5D
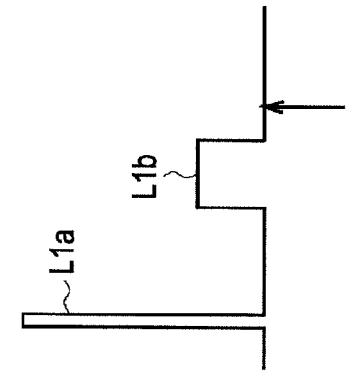 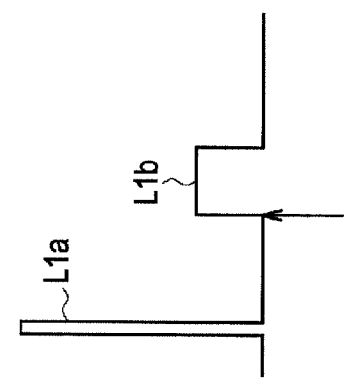 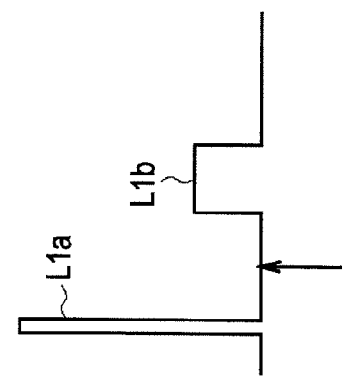 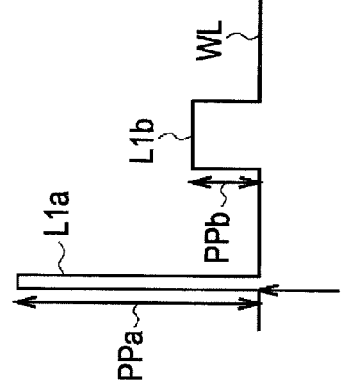

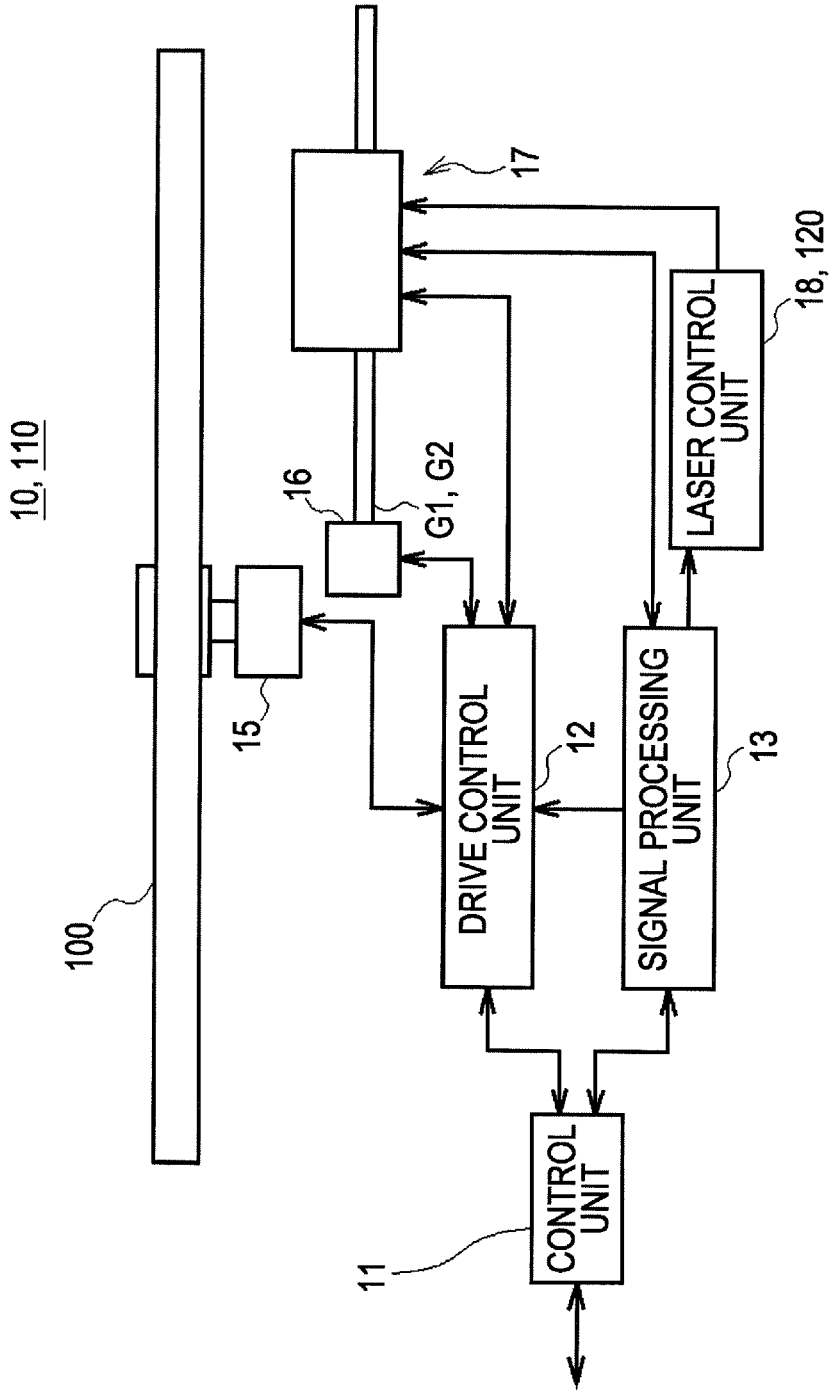

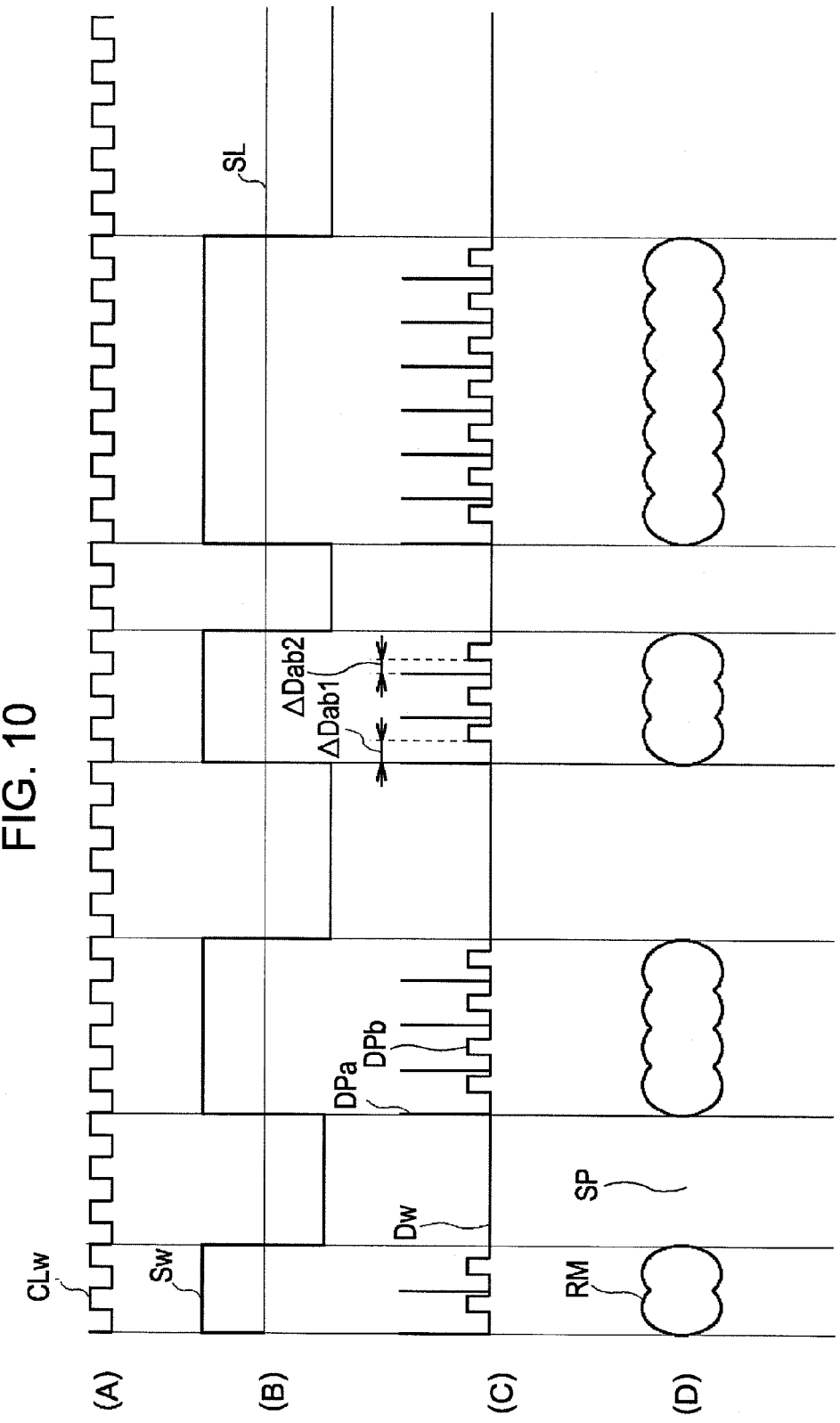

OPTICAL INFORMATION RECORDING MEDIUM, OPTICAL INFORMATION RECORDING APPARATUS AND OPTICAL INFORMATION RECORDING METHOD

This application is a continuation of U.S. patent application Ser. No. 12/544,360, titled "OPTICAL INFORMATION RECORDING MEDIUM, OPTICAL INFORMATION RECORDING APPARATUS, AND OPTICAL INFORMATION RECORDING METHOD," filed on Aug. 20, 2009, which claims the benefit under 35 U.S.C. §119 of Japanese Patent Application JP 2008-214402, filed on Aug. 22, 2008. The contents of these applications are hereby incorporated by reference in their entireties.

BACKGROUND OF THE INVENTION

1. Field of the Invention

The present invention relates to an optical information recording medium, an optical information recording apparatus, and an optical information recording method. The present invention can be suitably applied to, for example, an optical information recording medium in which information is recorded using a light beam and from which the information is reproduced using the light beam.

2. Description of the Related Art

Disc-shaped optical information recording media are in widespread use, and examples of such an optical information recording medium include a compact disc (CD), a digital versatile disc (DVD), and a Blu-ray Disc® (hereinafter referred to as BD).

An optical information recording/reproducing apparatus which uses the optical information recording medium records various kinds of information including various contents, such as music contents and video contents, and various data for use in a computer or the like in the optical information recording medium. Recently, the amount of information to be recorded has increased in accordance with the increase in the definition of video and sound quality of music. In addition, there has been a demand to increase the number of contents that can be recorded in a single optical information recording medium. Therefore, optical information recording media having larger capacities have been demanded.

To increase the capacity of an optical information recording medium, Japanese Unexamined Patent Application Publication No. 2005-37658 proposes an optical information recording medium which is made of a material capable of forming recording pits therein in response to two-photon absorption and in which information can be three-dimensionally recorded in a thickness direction by using a laser source with high peak power.

SUMMARY OF THE INVENTION

However, further increase in the recording capacity of the optical information recording medium has been demanded.

The present invention has been made in consideration of the above situation, and provides an optical information recording medium, an optical information recording apparatus, and an optical information recording method with which the recording capacity can be increased.

According to an embodiment of the present invention, an optical information recording medium includes a recording layer in which a track is formed, the track having recording marks linearly arranged thereon. Each recording mark has a dimension corresponding to a reference mark length, which serves as a reference, in a track direction along which the track extends, the dimension being smaller than dimensions of the recording mark in two directions perpendicular to the track direction.

Accordingly, in the optical information recording medium, a large number of recording marks can be arranged in the track direction.

According to another embodiment of the present invention, an optical information recording medium includes a recording layer containing a light-absorption change material which changes light absorption characteristics of the recording layer in response to a two-photon absorption reaction caused by irradiation with, first recording light and then causes a thermal reaction in response to irradiation with second recording light after the irradiation with the first recording light, a refractive index of the recording layer being locally changed in response to the thermal reaction.

Thus, in the optical information recording medium, each recording mark can be formed such that the dimension thereof which corresponds to the reference mark length in the track direction is smaller than the dimensions thereof in two directions perpendicular to the track direction. As a result, a large number of recording marks can be arranged in the track direction.

According to another embodiment of the present invention, in an optical information recording medium, recording mark is formed only in an area in which a thermal reaction is caused in a change area formed as a result of a two-photon absorption reaction caused by irradiation with first recording light, the thermal reaction being caused by irradiation with second recording light after the irradiation with the first recording light.

Thus, in the optical information recording medium, each recording mark can be formed such that the dimension thereof which corresponds to the reference mark length in the track direction is smaller than the dimensions thereof in two directions perpendicular to the track direction. As a result, a large number of recording marks can be arranged in the track direction.

According to another embodiment of the present invention, an optical information recording apparatus includes a light source which emits recording light; a light emitting unit which irradiates an optical information recording medium with the recording light, the recording light including first recording light and second recording light emitted after the first recording light, a recording mark being formed in the optical information recording medium only in an area in which both a two-photon absorption reaction caused by irradiation with the first recording light and a thermal reaction caused by irradiation with the second recording light occur; a position adjusting unit which positions a focal point of the recording light emitted from the light emitting unit at a desired target position; and an irradiation control unit which controls the irradiation with the first recording light and the second recording light such that a change area irradiated with the first recording light and an irradiation area irradiated with the second recording light only partially overlap each other.

Thus, according to the optical information recording apparatus, each recording mark can be formed such that the dimension thereof which corresponds to the reference mark length in the track direction is smaller than the dimensions thereof in two directions perpendicular to the track direction. As a result, a large number of recording marks can be arranged in the track direction.

According to another embodiment of the present invention, an optical information recording method includes the steps of irradiating an optical information recording medium with first recording light, a recording mark being formed in the optical information recording medium only in an area in which both a two-photon absorption reaction caused by irradiation with the first recording light and a thermal reaction caused by irradiation with second recording light occur; and irradiating the optical information recording medium with the second recording light such that a change area irradiated with the first recording light and an irradiation area irradiated with the second recording light only partially overlap each other.

Thus, according to the optical information recording method, each recording mark can be formed such that the dimension thereof which corresponds to the reference mark length in the track direction is smaller than the dimensions thereof in two directions perpendicular to the track direction. As a result, a large number of recording marks can be arranged in the track direction.

According to the embodiments of the present invention, each recording mark can be formed such that the dimension thereof which corresponds to the reference mark length in the track direction is smaller than the dimensions thereof in two directions perpendicular to the track direction. As a result, a large number of recording marks can be arranged in the track direction. Thus, according to the embodiments of the present invention, an optical information recording medium, an optical information recording apparatus, and an optical information recording method capable of increasing the recording capacity are provided.

BRIEF DESCRIPTION OF THE DRAWINGS

FIGS. 3A to 3C are schematic diagrams illustrating an operation of forming a recording mark according to a related art;

FIGS. 5A to 5D are schematic diagrams illustrating the principle of an embodiment of the present invention;

FIG. 8 is a schematic diagram illustrating an optical information recording/reproducing apparatus;

FIG. 10 is a schematic diagram illustrating an information recording process according to the first embodiment;

DESCRIPTION OF THE PREFERRED EMBODIMENTS

Embodiments of the present invention will be described in detail below with reference to the drawings.

1. Principle

In general, when NA is the numerical aperture of an objective lens and $\lambda$ is the wavelength of a light beam, a spot diameter d obtained when the light beam is focused can be obtained as follows:

$$d = \lambda/NA \quad (1)$$

In the case where a single objective lens is used, the spot diameter d is proportional to the wavelength $\lambda$ of the light beam since the numerical aperture NA is constant.

Figure 1:
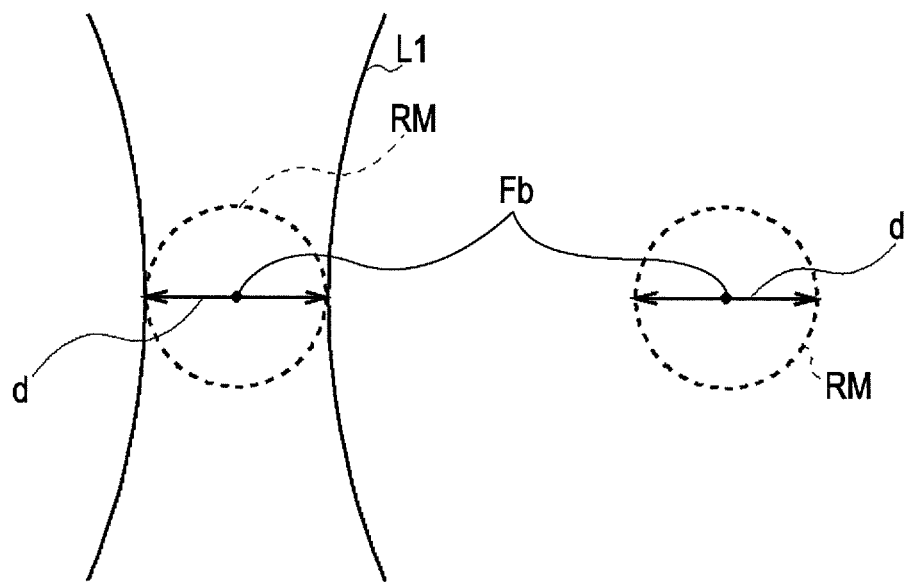
FIG. 1 is a schematic diagram illustrating an operation of forming a recording mark by one-photon absorption.

As shown in FIG. 1, the intensity of the focused light beam is at a maximum in an area near a focal point Fb, and decreases as the distance from the focal point Fb increases. In a common optical information recording medium in which a recording mark RM is formed by one-photon absorption, an optical reaction is generated when a single photon is absorbed. Therefore, the optical reaction is generated in proportion to the light intensity. Consequently, the recording mark RM is formed in the optical information recording medium in an area in which the intensity of the recording light beam L1 is equal to or higher than a predetermined level. FIG. 1 shows the case in which a recording mark RM having a diameter equal to the spot diameter d is formed.

Figure 2:
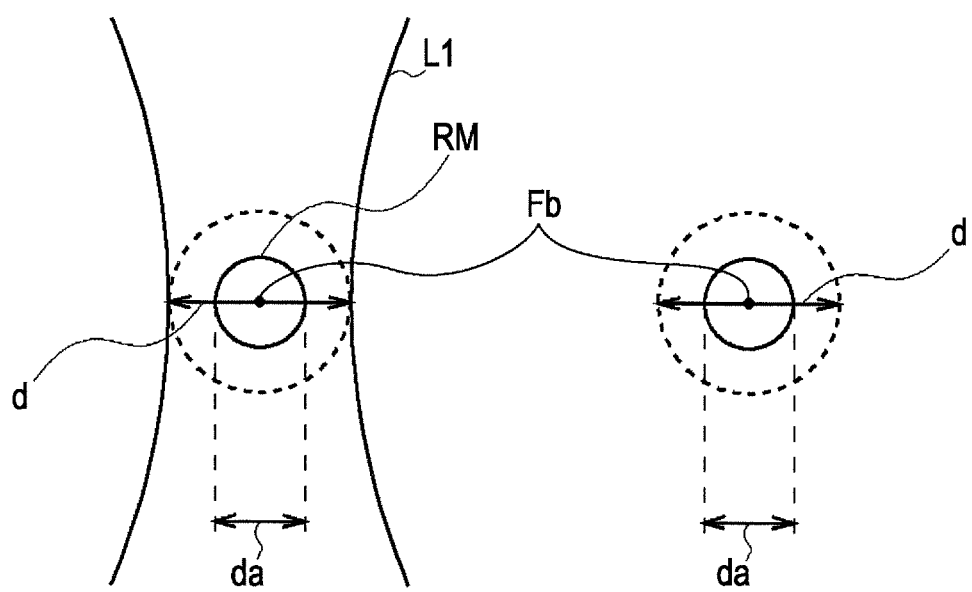
FIG. 2 is a schematic diagram illustrating an operation of forming a recording mark by two-photon absorption.

In contrast, in the case where the recording mark RM is formed by two-photon absorption, the reaction occurs only when two photons are absorbed at the same time. Therefore, the two-photon absorption reaction occurs in proportion to the square of the light intensity. Consequently, in an optical information recording medium 100 (see FIG. 6) according to the present embodiment, the recording mark RM is formed only in an area near the focal point Fb in which the light intensity of the recording light beam L1 is very high, as shown in FIG. 2.

The size of the thus-formed recording mark RM is small and the diameter da thereof is smaller than the spot diameter d of the recording light beam L1. Therefore, the recording capacity of the optical information recording medium 100 can be increased by forming recording marks RM with high density.

An example of a two-photon absorption material is a compound having light absorption characteristics which change in response to a chemical reaction caused by the two-photon absorption (hereinafter referred tows an optical-characteristic change material) (see, for example, A. Toriumi and S. Kawata, Opt. Lett/Vol. 23, No. 24, 1998, 1924-1926).

Here, a case is considered in which, for example, the optical-characteristic change material is irradiated for a certain irradiation time with a high-light-intensity recording light beam L1 having a wavelength at which absorption does not originally occur, as shown by a light emission wave WL in FIG. 3A. In such a case, as shown in FIG. 3B, the light absorption characteristics of the optical-characteristic change material change as a result of the two-photon absorption and an absorption change area RA, which is smaller than the spot P of the recording light beam L1, is formed. In the absorption change area RA, the light absorption characteristics of the optical-characteristic change material are changed. Therefore, the recording light beam L1 is absorbed and heat is generated. The arrows on the light emission wave WL show the times at which the states of irradiation with the recording light beam L1 shown in the upper parts of FIGS. 3A to 3C are obtained.

Therefore, if the optical-characteristic change material is continuously irradiated with the recording light beam L1 as shown in FIG. 3C, the optical-characteristic change material absorbs the recording light beam L1 and generates heat. As a result, the refractive index of the optical-characteristic change material is modulated or a hollow section is formed as a result of a thermal reaction. Thus, the recording mark RM can be formed.

When the thus-formed recording mark RM is irradiated with a reading light beam L2 for reproducing information, the recording mark RM reflects the reading light beam L2 in accordance with the difference in the refractive index between the recording mark RM and the surrounding area, and thereby generates a returning light beam L3. The optical information recording/reproducing apparatus irradiates the optical information recording medium with the reading light beam L2 and generates a reproduction signal SRF in accordance with a change in the intensity of the returning light beam L3. The presence or absence of the recording mark RM can be detected on the basis of the reproduction signal SRF, and thus the information can be reproduced.

Figure 4A:
FIGS. 4A to 4F are schematic diagrams illustrating recording marks and the characteristics of reproduction signals.
Figure 4B:
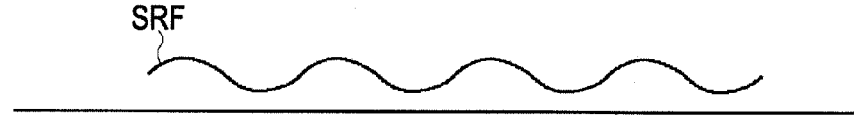

To increase the recording capacity of the optical information recording medium, the size of each recording mark RM is preferably reduced by, for example, increasing the numerical aperture NA of the objective lens. However, if the size of each recording mark RM is reduced as shown in FIG. 4A, the overall intensity of the returning light beam L3 decreases and the overall signal level of the reproduction signal SRF decreases accordingly, as shown in FIG. 4B. As a result, the amplitude of the reproduction signal SRF decreases and the reproduction characteristics are degraded.

Figure 4C:
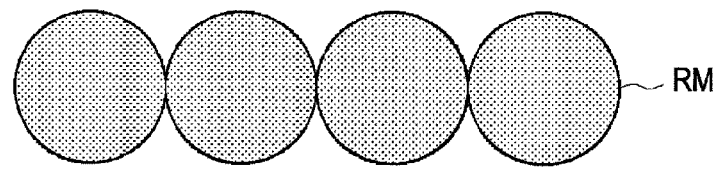
Figure 4D:

If the size of each recording mark RM is increased as shown in FIG. 4C, the overall intensity of the returning light beam L3 increases and the signal level of the reproduction signal SRF increases accordingly, as shown in FIG. 4D. However, the recording marks RM become close to each other and intersymbol interference (that is, crosstalk) occurs. As a result, the amplitude of the reproduction signal SRF decreases and the reproduction characteristics are degraded.

Figure 4E:
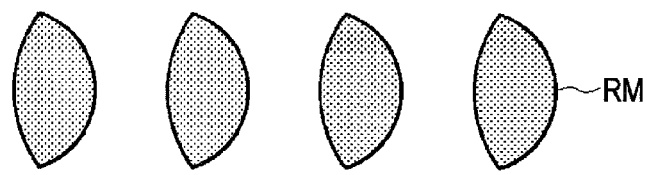

Therefore, according to the embodiment of the present invention, as shown in FIG. 4E, the recording marks RM are formed such that the dimension of each recording mark RM in a direction in which a track TR, along which the recording marks RM are formed, extends (hereinafter referred to as a track direction) is smaller than the dimensions of the recording mark RM in two directions which are perpendicular to the track direction.

Figure 4F:

Thus, according to the embodiment of the present invention, the recording capacity of the optical information recording medium can be increased by increasing the number of recording marks RM arranged in the track direction. In addition, as shown in FIG. 4F, the reproduction characteristics can be improved by increasing the intensity of the returning light beam L3 and reducing the crosstalk in the reproduction signal SRF.

According to the embodiment of the present invention, as shown in FIGS. 5A to 5D, which correspond to FIGS. 3A to 3C, a recording light beam L1 having a first emission light intensity PPa (FIG. 5A) (hereinafter called a recording light beam L1a), with which a two-photon absorption reaction can be obtained, is emitted. As a result, as shown in FIG. 5B, an absorption change area RA in which the light absorption characteristics of the optical-characteristic change material are changed is formed. The absorption change area RA is formed as a result of the two-photon absorption reaction. Therefore, the diameter da (see FIG. 2) of the absorption change area RA is smaller than the diameter d (see FIG. 1) of the spot P.

Then, in the embodiment of the present invention, as shown in FIG. 5C, a recording light beam L1 having a second emission light intensity PPb (hereinafter called a recording light beam L1b) is emitted while the center $C_P$ of the recording light beam L1 (spot P) is shifted from the center $C_{RA}$ of the absorption change area RA in the track direction. The second emission light intensity PPb is smaller than the first emission light intensity PPa.

As this time, only a part of the recording light beam L1b overlaps the absorption change area RA. The recording light beam L1b is not absorbed in an area outside the absorption change area RA, but is absorbed in the absorption change area RA.

As a result, as show in FIG. 5D, the optical information recording medium generates heat in an area in which the absorption change area RA and the recording light beam L1b overlap each other, and the recording mark RM can be formed as a result of thermal reaction only in the overlapping area. Thus, according to the embodiment of the present invention, the recording mark RM having a dimension that is smaller than the diameter da of the absorption change area RA in the track direction can be formed in the optical information recording medium.

Thus, according to the embodiment of the present invention, the recording mark RM having a small dimension in the track direction can be formed by combining the two-photon absorption reaction and the thermal reaction.

2. First Embodiment

2-1. Structure of Optical Information Recording Medium

Figure 6A:
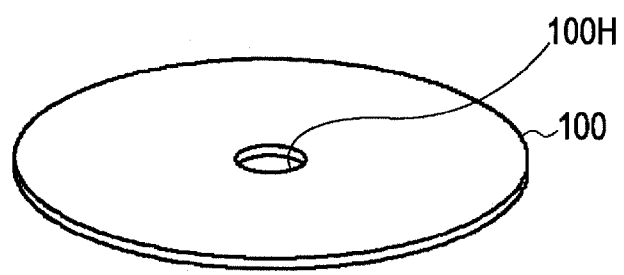
FIGS. 6A and 6B are schematic diagrams illustrating the structure of an optical information recording medium.
Figure 6B:
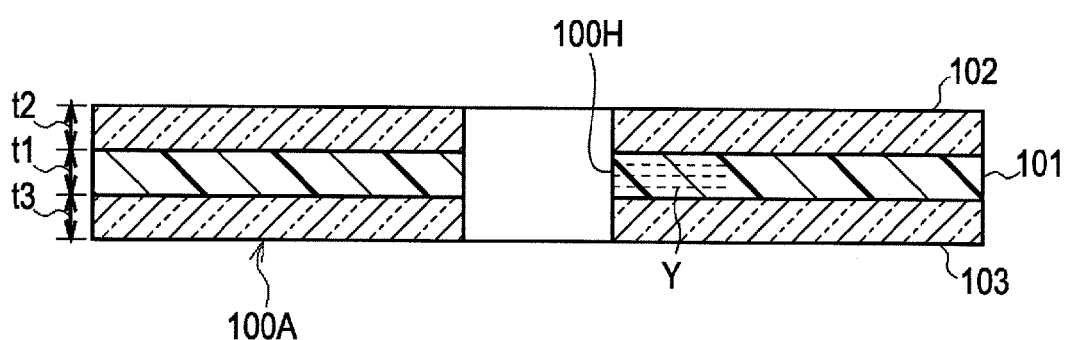

As shown in FIGS. 6A and 6B, the optical information recording medium 100 has a disc-like shape, and a hole 100H used when the optical information recording medium 100 is chucked is formed at a central area thereof. The optical information recording medium 100 includes substrates 102 and 103 and a recording layer 101 interposed between the substrates 102 and 103, and functions as a medium in which information can be recorded.

The substrates 102 and 103 are made of an optical material, such as glass or polycarbonate, and have a high light transmittance. The thicknesses t2 and t3 of the substrates 102 and 103, respectively, can be suitably selected from the range of 0.05 [nm] to 1.2 [nm]. The thicknesses t2 and t3 may either be equal to each other or different from each other.

The recording layer 101 is obtained by dispersing the optical-characteristic change material into a binder resin, which is the main component. The optical-characteristic change material serves to change the light absorption characteristics thereof by changing the chemical structure in response to the two-photon absorption of the recording light beam L1. As a result, the optical-characteristic change material absorbs the recording light beam L1 and generates heat.

The optical-characteristic change material may be, for example, a common two-photon absorption material or a photochromic material which changes the chemical structure thereof in response to light. Various organic dyes, such as cyanine dye, merocyanine dye, arylidene dye, oxonol dye, squarylium dye, azo dye, and phthalocyanine dye, or various inorganic crystals may be used as the two-photon absorption material.

Azobenzenes, spiropyrans, spirooxazines, and diarylethenes are suitable for use as the photochromic material. For example, 1,2-bis(2-methylbenzo[b]thiophen-3-yl)perfluorocyclopentene (see Stefano Cattaneo. Steve Lecomte, Christian Bosshard, Germano Montemezzani, and Peter Gunter, J. Opt. Soc. Am. B/Vol. 19, September 2002, 2032-2038) is suitable for use as the photochromic material.

Various resin materials having high transmittance to light beams may be used as the binder resin. For example, a thermoplastic resin which becomes soft when heat is applied, a photocurable resin which cures in response to bridging or polymerization reaction caused by light, a thermosetting resin which cures in response to bridging or polymerization reaction caused by heat, etc., can be used as the binder resin.

Although the resin material is not particularly limited, polymethylmethacrylate (PMMA) resin or polycarbonate resin are suitable for use in view of weather resistance, light transmittance, etc., and various kinds of additives may be added to the binder resin.

The refractive index of the recording layer 101 is modulated when heat is generated by the optical-characteristic change material. The modulation of the refractive index is caused by, for example, a local change in the refractive index in response to a chemical reaction or a hollow section formed by vaporization of a vaporizing material contained in the recording layer 101. Alternatively, the modulation of the refractive index of the recording layer 101 may be obtained by a chemical change in the optical-characteristic change material in response to the thermal reaction. Alternatively, the modulation of the refractive index may be obtained by a chemical change in the binder resin or the additives added to the binder resin.

In the case where, for example, a thermoplastic resin is used as the binder resin, the optical-characteristic change material is added to the thermoplastic resin in a heated state and is kneaded with a kneading machine. Thus, the optical-characteristic change material is dispersed in the binder resin.

The binder resin in which the optical-characteristic change material is dispersed is spread over the substrate 103, and is then cooled so that the recording layer 101 can be formed. Subsequently, the substrate 102 is adhered to the recording layer 101 using, for example an UV adhesive. Thus, the optical information recording medium 100 is manufactured.

The thermoplastic resin may also be diluted with an organic solvent or the like (this type of thermoplastic resin is hereinafter called a solvent-diluted resin and is distinguished from a thermoplastic resin formed by applying heat). In such a case, the resin to be diluted may be dissolved in the organic solvent after the optical-characteristic change material is dissolved or dispersed in the organic solvent. Alternatively, the optical-characteristic change material may be added to and mixed with the solvent-diluted resin after the resin is diluted with the organic solvent. Thus, the optical-characteristic change material can be dispersed in the binder resin.

The binder resin in which the optical-characteristic change material is dispersed is spread over the substrate 103, and is then heated and dried so that the recording layer 101 can be formed. Subsequently, the substrate 102 is adhered to the recording layer 101 using, for example an UV adhesive. Thus, the optical information recording medium 100 is manufactured.

In the case where a thermosetting resin or a photocurable resin is used as the binder resin, the optical-characteristic change material is added to and mixed with the resin before the resin is cured. Thus, the optical-characteristic change material can be dispersed in the binder resin.

Then, the binder resin in which the optical-characteristic change material is dispersed is spread over the substrate 103, and is optically or thermally cured in the state in which the substrate 102 is placed on the uncured recording layer 101. Thus, the optical information recording medium 100 is manufactured.

As described above, the recording mark RM is formed in the optical information recording medium 100 as a result of both the two-photon absorption reaction and the thermal reaction.

When the recording layer 101 is irradiated with the recording light beam L1 having a relatively high intensity, the chemical structure of the optical-characteristic change material included in the recording layer 101 is changed by the two-photon absorption reaction. As a result, the absorption change area RA which absorbs the recording light beam L1 is formed. Then, when the recording layer 101 is further irradiated with the recording light beam L1, the recording mark RM is recorded at the position of the focal point Fb in response to heat generated in the absorption change area RA. The optical information recording medium 100 may be irradiated with the recording light beam L1 while the optical information recording medium 100 is being rotated. Thus, a track TR on which a plurality of recording marks RM are linearly arranged can be formed in a spiral or concentric pattern.

As described above, according to the embodiment of the present invention, the irradiation area of the recording light beam L1 is shifted from the absorption change area RA, so that each recording mark RM can be formed such that a dimension thereof in the track direction is smaller than the dimensions thereof in two directions (the radial direction and the thickness direction of the optical information recording medium 100) which are perpendicular to the track direction.

Figure 7A:
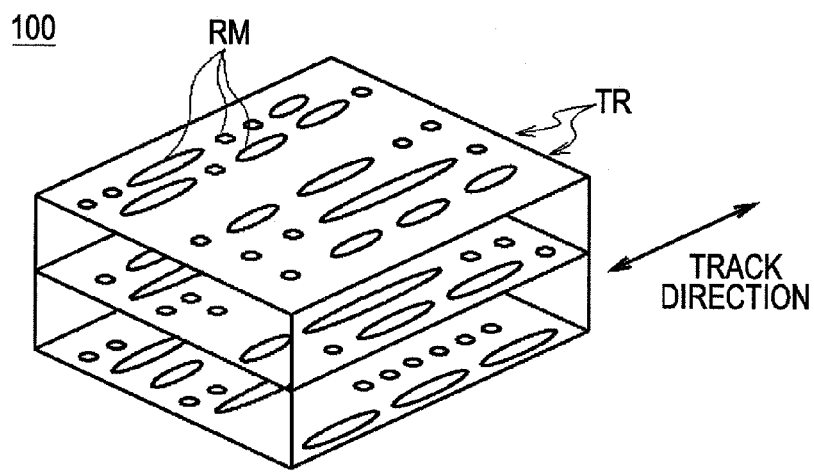
FIGS. 7A to 7C are schematic diagrams illustrating an operation of forming a recording mark.
Figure 7B:
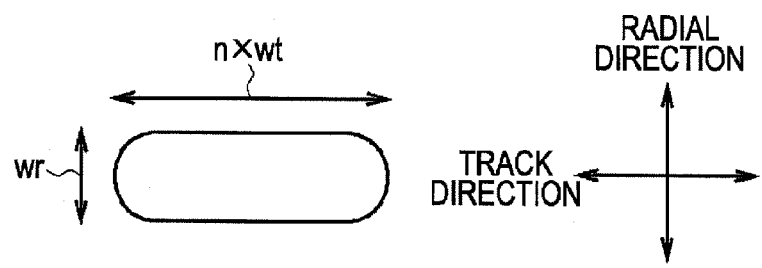
Figure 7C:
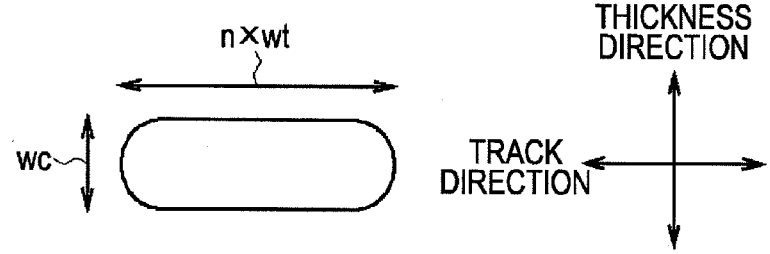

According to the present embodiment, as shown in FIG. 7A, the recording marks RM can be formed in the recording layer 101 in different lengths (for example, 2T to 11T) obtained by multiplying a reference mark length 1T, which serves as a reference, by an integer n. Referring to FIG. 7B, in the recording layer 101, each recording mark RM is formed such that a dimension wt which corresponds to the reference mark length 1T in the track direction is smaller than a dimension wr in the radial direction and a dimension we in the thickness direction of the optical information recording medium 100.

Accordingly, in the optical information recording medium 100, a large number of recording marks RM can be arranged in the track direction. Therefore, the recording capacity of the optical information recording medium 100 is larger than that of the optical information recording medium according to the related art.

In addition, the recording marks RM formed in the above-described manner are arranged along planes which are substantially parallel to the surfaces, such as a first surface 100A (see FIG. 6B) of the optical information recording medium 100. Thus, a plurality of mark layers Y which each include the recording marks RM are formed.

In an information reproducing process, the reading light beam L2 is incident on, for example, the first surface 100A of the optical information recording medium 100 and is focused on a target position PG (position to be irradiated with the light beam). If a recording mark RM is formed at the position of the focal point Fb (that is, the target position PG), the reading light beam L2 is reflected by the recording mark RM and the returning light beam L3 is emitted from the recording mark RM.

Thus, in the optical information recording medium 100, the presence or absence of the recording marks RM can be detected on the basis of the returning light beam L3 by detecting the intensity of the returning light beam L3.

As described above, in the optical information recording medium 100, the recording marks RM are formed only in areas where both the two-photon absorption reaction and the thermal reaction occur. Therefore, in the optical information recording medium 100, the recording marks RM can be formed such that the aspect ratio of the dimension in the radial direction to the dimension corresponding t the reference mark length 1T in the track direction and the aspect ratio of the dimension in the focus direction to the dimension corresponding to the reference mark length 1T in the track direction are both larger than 1.

2-2. Structure of Optical Information Recording/Reproducing Apparatus

As shown in FIG. 8, an optical information recording/reproducing apparatus 10 includes a control unit 11 as a main component. Although not shown in FIG. 8, the control unit 11 includes a central processing unit (CPU), a read only memory (ROM) which stores various programs and the like, and a random access memory (RAM) used as a work memory for the CPU.

In the operation of recording information in the optical information recording medium 100, the control unit 11 causes a drive control unit 12 to rotate a spindle motor 15 so that the optical information recording medium 100 placed on a turntable (not shown) rotates at a desired speed.

The control unit 11 also causes the drive control unit 12 to drive a sled motor 16 so that an optical pickup 17 largely moves along moving shafts G1 and G2 in the radial direction, that is, in a direction toward the inner periphery or the outer periphery of the optical information recording medium 100.

In the operation of recording information in the optical information recording medium 100, the control unit 11 receives the recording information from an external apparatus and supplies the recording information to a signal processing unit 13. The signal processing unit 13 subjects the recording information to a predetermined modulation process or a binarization process to generate recording data Sw, and supplies the recording data Sw to a laser control unit 18.

The laser control unit 18 generates a laser driving current Dw on the basis of the recording data Sw, and supplies the laser driving current Dw to a recording/reproducing light source 20 included in the optical pickup 17. As a result, the recording/reproducing light source 20 emits the recording light beam L1 which is modulated in accordance with the information.

The control unit 11 controls the optical pickup 17 such that the optical pickup 17 emits the recording light beam L1 toward the target position PG at which the optical information recording medium 100 is to be irradiated with the recording light beam L1. As a result, the information is recorded in the recording layer 101.

In the operation of reproducing the information recorded on the optical information recording medium 100, the control unit 11 causes the laser control unit 18 to generate a laser driving current Dw at a substantially constant level and supplies the laser driving current Dw to the recording/reproducing light source 20. As a result, the recording/reproducing light source 20 emits the reading light beam L2 at a substantially constant emission light intensity.

The optical pickup 17 receives the returning light beam L3 which returns from the optical information recording medium 100 and supplies a detection signal corresponding to the intensity of the received returning light beam L3 to the signal processing unit 13.

The signal processing unit 13 generates the reproduction signal SRF which represents the intensity of the returning light beam L3 on the basis of the detection signal, and then generates reproduction data by subjecting the reproduction signal SRF to a predetermined binarization process or a demodulation process. The thus-generated reproduction data is supplied to the control unit 11.

As described above, the optical information recording/reproducing apparatus 10 is capable of recording information in the optical information recording medium 100 and reproducing the information from the optical information recording medium 100.

Figure 9:
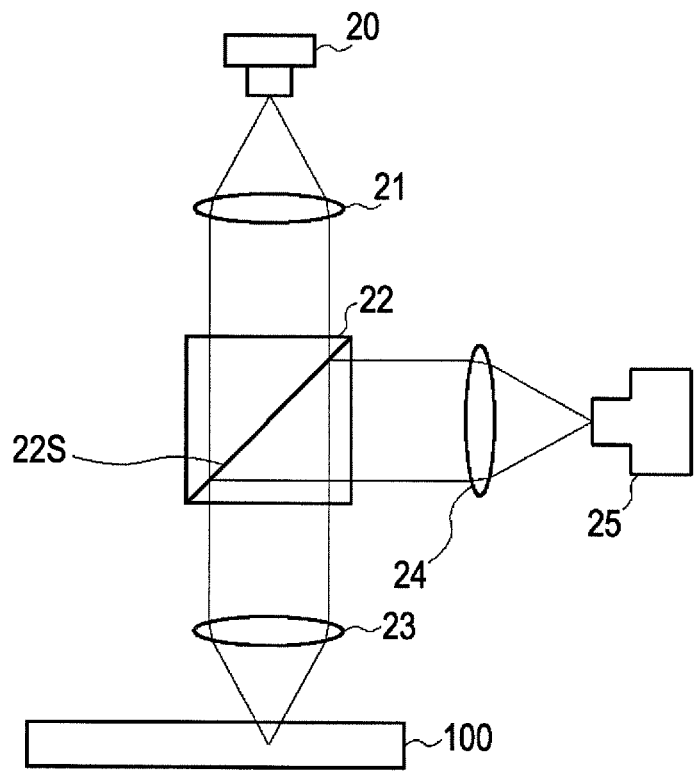
FIG. 9 is a schematic diagram illustrating the structure of an optical pickup according to a first embodiment.

As shown in FIG. 9, in the information recording process, the optical pickup 17 causes the recording/reproducing light source 20 to emit the recording light beam L1 with a wavelength of, for example, 405 [nm] under the control of the control unit 11. The thus-emitted recording light beam L1 is converted from divergent light to collimated light by a collimator lens 21 and is incident on a beam splitter 22.

The beam splitter 22 includes a reflective-transmissive surface 22S which reflects and transmits a light beam at a predetermined ratio. When the recording light beam L1 is incident on the reflective-transmissive surface 22S, the reflective-transmissive surface 22S transmits the recording light beam L1 so that the recording light beam L1 is incident on an objective lens 23. The objective lens 23 focuses the recording light beam L1 on the target position PG in the optical information recording medium 100, so that the recording mark RM is formed. This will be described in more detail below.

At this time, the recording mark RM is formed in the optical information recording medium 100 at a position near the focal point Fb of the recording light beam L1 such that the dimension wt corresponding to the reference mark length 1T in the track direction is smaller than the diameter da, which is smaller than the spot diameter d of the recording light beam L1.

In the information reproducing process, the optical pickup 17 causes the recording/reproducing light source 20 to emit the reading light beam L2 under the control of the control unit 11. Then, similarly to the information recording process, the reading light beam L2 is focused on the target position PG in the optical information recording medium 100.

If the recording mark RM is formed in the optical information recording medium 100 at the focus position of the reading light beam L2, the reading light beam L2 is reflected due to the difference in the refractive index between the recording mark RM and the surrounding area in the recording layer 101. As a result, the returning light beam L3 is generated. If the recording mark RM is not formed in the optical information recording medium 100 at the focus position of the reading light beam L2, the reading light beam L2 passes through the optical information recording medium 100. Therefore, the returning light beam L3 is hardly generated.

The returning light beam L3 which returns from the optical information recording medium 100 is converted into collimated light by the objective lens 23, and is incident on the beam splitter 22. At this time, a part of the returning light beam L3 is reflected by the reflective-transmissive surface 22S of the beam splitter 22 and is incident on a condenser lens 24. The part of the returning light beam L3 incident on the condenser lens 24 is focused by the condenser lens 24 and is received by a light receiving element 25.

The light receiving element 25 detects the intensity of the returning light beam L3, generates a detection signal corresponding to the intensity of the returning light beam L3, and outputs the detection signal to the control unit 11. Thus, the control unit 11 can recognize the state of detection of the returning light beam L3 on the basis of the detection signal.

At this time, each recording mark RM is formed in the optical information recording medium 100 at a position near the focal point Fb of the recording light beam L1 such that the dimension wt corresponding to the reference mark length 1T in the track direction is smaller than the diameter da. Therefore, intervals (that is, spaces SP) between the recording marks RM having respective mark lengths can be ensured even when a large number of recording marks RM are arranged in the track direction, and the optical information recording/reproducing apparatus 10 is capable of generating a high-quality reproduction signal SRF in which crosstalk is reduced.

The optical pickup 17 moves the objective lens 23 with an actuator (not shown) in the thickness direction of the optical information recording medium 100, so that the focal point of the recording light beam L1 or the reading light beam L2 can be positioned at the desired mark layer Y.

Thus, the optical information recording/reproducing apparatus 10 performs the operation of recording the information in the optical information recording medium 100 or reproducing the information from the optical information recording medium 100.

2-3. Information Recording Process

The information recording process will now be described.

As shown in FIG. 10, the signal processing unit 13 (FIG. 8) generates the recording data Sw which switches between a "high" level and a "low" level in synchronization with a recording clock CLw (part (A) in FIG. 10), and supplies the recording data Sw to the laser control unit 18. In the recording data Sw, the "high" level shows that the recording mark RM is to be formed, and the "low" level shows that the space SP which is free from the recording mark RM is to be formed.

The laser control unit 18 generates the laser driving current Dw, which is a combination of a current pulse Dpa corresponding to the recording light beam L1a and a current pulse Dpb corresponding to the recording light beam L1b, on the basis of the recording data Sw, and thereby adjusts the emission light intensity of the recording beam L1.

As an example, a case in which a recording mark RM having a mark length 3T, which is three times as long as the reference mark length 1T, is formed will be described with reference to FIGS. 11A to 14, which correspond to FIGS. 5A to 5D.

Figure 11A:
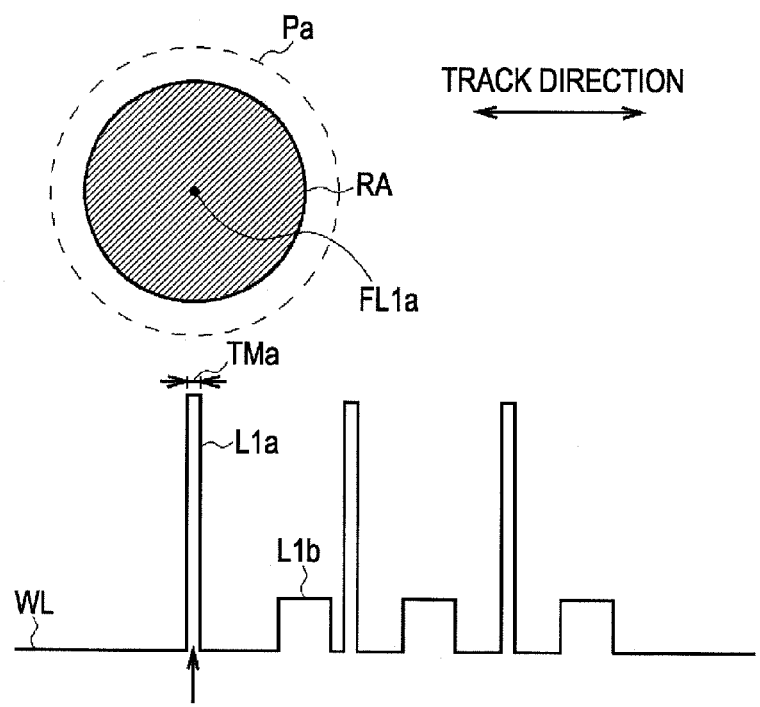
FIGS. 11A and 11B are schematic diagrams illustrating a recording-mark forming operation according to the first embodiment.

As shown in the lower part of FIG. 11A, the recording/reproducing light source 20 emits the recording light beam L1a having the first emission light intensity PPa, which is relatively high, for a first emission time TMa. As a result, as shown in the upper part of FIG. 11A, the absorption change area RA having the diameter da smaller than the diameter d of the spot Pa of the recording light beam L1a is formed in the recording layer 101 at a position near the focal point FL1a of the recording light beam L1a as a result of the two-photon absorption reaction of light-absorption change material.

Figure 11B:
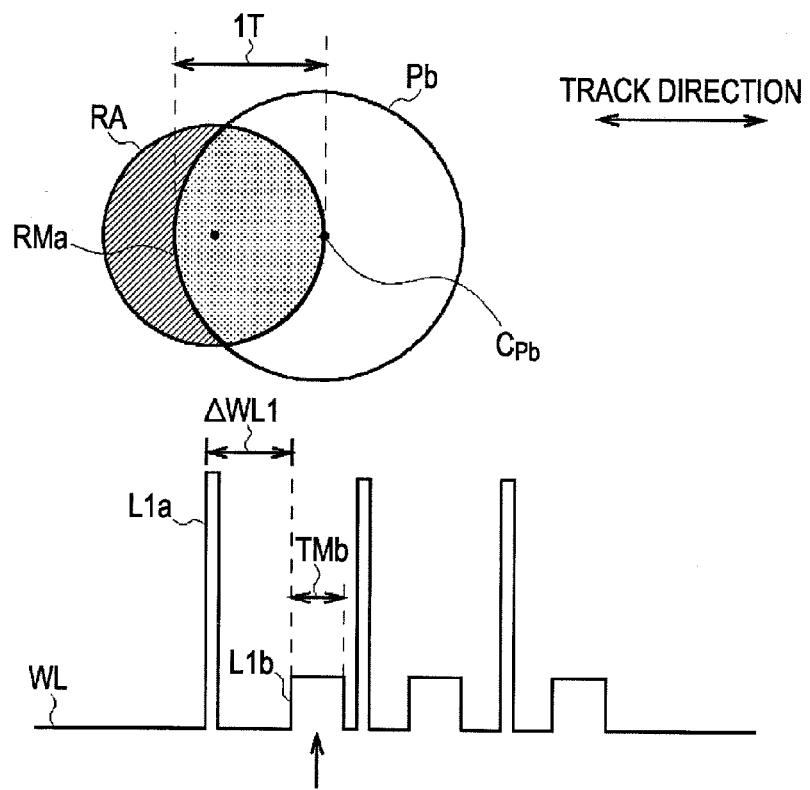

Then, as shown in the lower part of FIG. 11B, when a predetermined emission delay time ΔWL1 elapses after the start of emission of the recording light beam L1a, the recording/reproducing light source 20 emits the recording light beam L1b having the second emission light intensity PPb, which is relatively low, for a second emission time TMb, which is longer than the first emission time TMa.

As a result, as shown in the upper part of FIG. 11B, the spot Pb of the recording light beam L1b emitted from the recording/reproducing light source 20 can be placed at a position shifted from the absorption change area RA by a distance corresponding to the emission delay time ΔWL1. Accordingly, as shown in the upper part of FIG. 11B, the recording/reproducing light source 20 can form the recording mark RM only in an area in which the spot Pb and the absorption change area RA overlap each other, and the dimension of the thus-formed recording mark RM in the track direction is substantially equal to the reference mark length 1T. This recording mark RM is hereinafter called a recording mark RMa, and is distinguished from recording marks RM formed in different mark lengths.

Figure 12A:
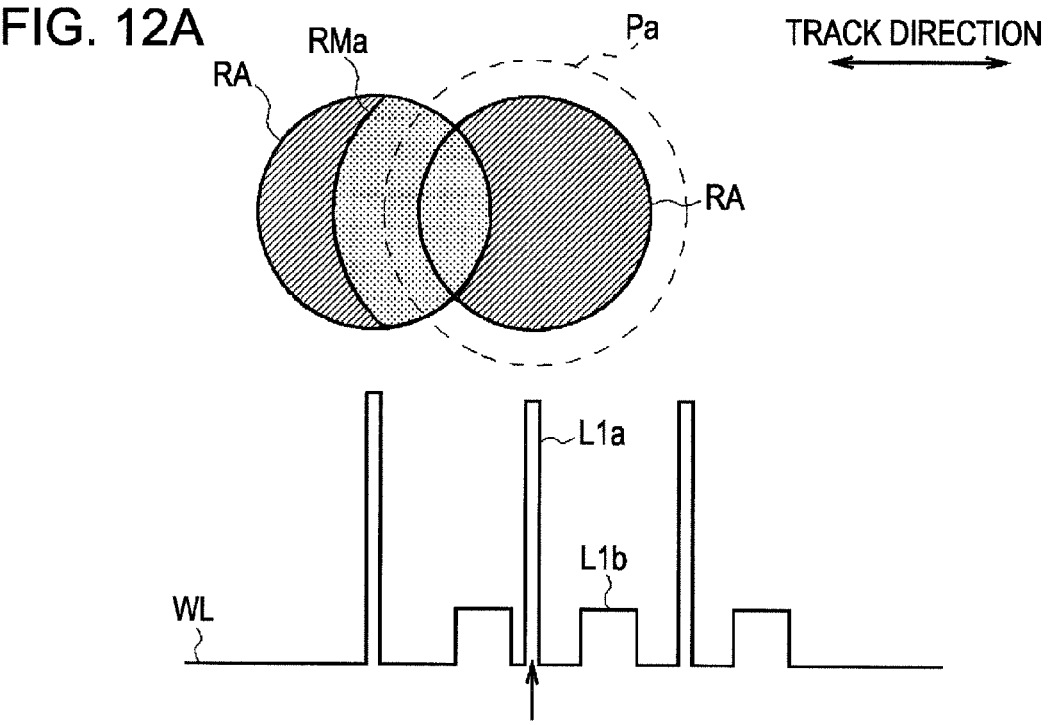
FIGS. 12A and 12B are schematic diagrams illustrating the recording-mark forming operation according to the first embodiment.

Then, as shown in the lower part of FIG. 12A, the recording/reproducing light source 20 emits the recording light beam L1a for the first emission time TMa. As a result, as shown in the upper part of FIG. 12A, the spot Pa of the recording light beam L1a emitted by the recording/reproducing light source 20 can be positioned in the recording layer 101 such that the spot Pa partially overlaps the recording mark RMa formed in FIG. 11B.

Accordingly, the absorption change area RA is formed in the recording layer 101 as a result of the two-photon absorption reaction of the light-absorption change material. The area in which the recording mark RMa is already formed is already subjected to thermal reaction, and therefore the absorption change area RA is not formed again in this area.

Figure 12B:
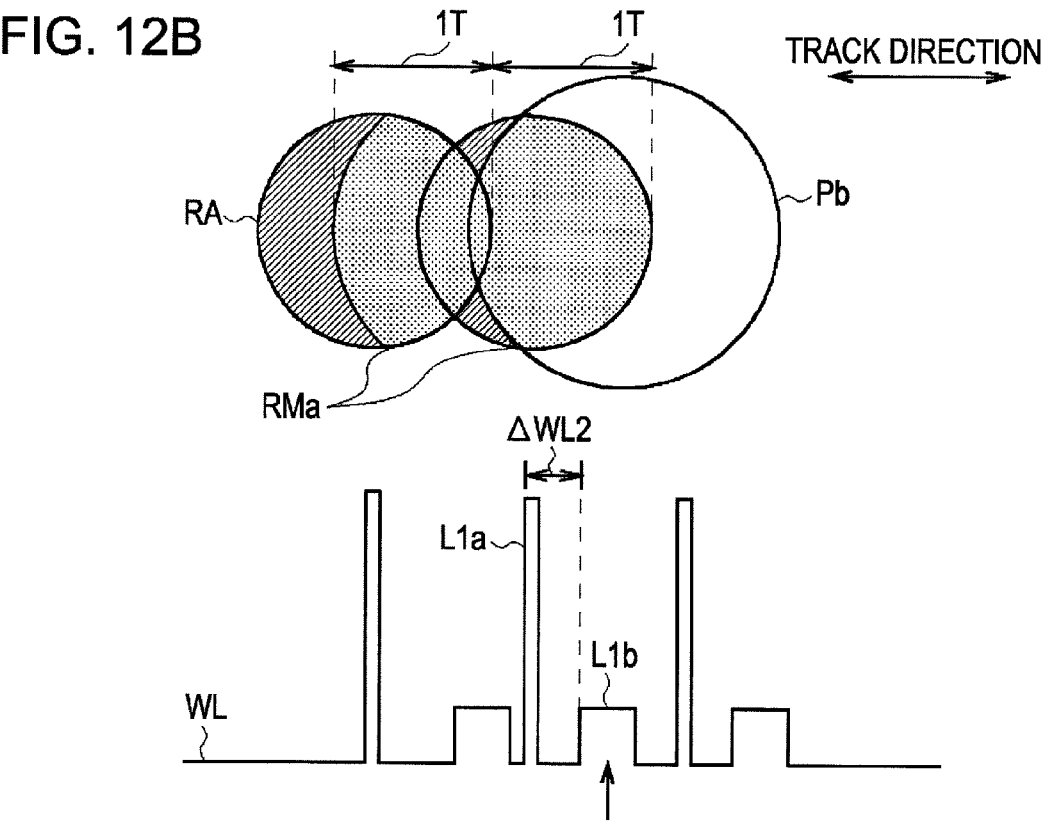

Then, as shown in the lower part of FIG. 12B, when a predetermined emission delay time ΔWL2, which is shorter than the emission delay time ΔWL1, elapses after the start of emission of the recording light beam L1a, the recording/reproducing light source 20 emits the recording light beam L1b having the second emission light intensity PPb for the second emission time TMb.

As a result, as shown in the upper part of FIG. 12B, the spot Pb of the recording light beam L1b emitted from the recording/reproducing light source 20 can be placed at a position shifted from the absorption change area RA by a distance corresponding to the emission delay time ΔWL2. Accordingly, as shown in the upper part of FIG. 12B, the spot Pb can be positioned such that the spot Pb partially overlaps the previously formed recording mark RMa (FIG. 11B), and the recording/reproducing light source 20 can form another recording mark RMa such that both of the recording marks RMa have a mark length that is substantially equal to the reference mark length 1T and such that the recording marks RMa partially overlap each other.

Thus, the recording/reproducing light source 20 can form a new recording mark RMa such that the distance between the rear end of the previously formed recording mark RMa and the rear end of the newly formed recording mark RMa is equal to the reference mark length 1T and such that the recording marks RMa partially overlap each other and are connected to each other.

Figure 13A:
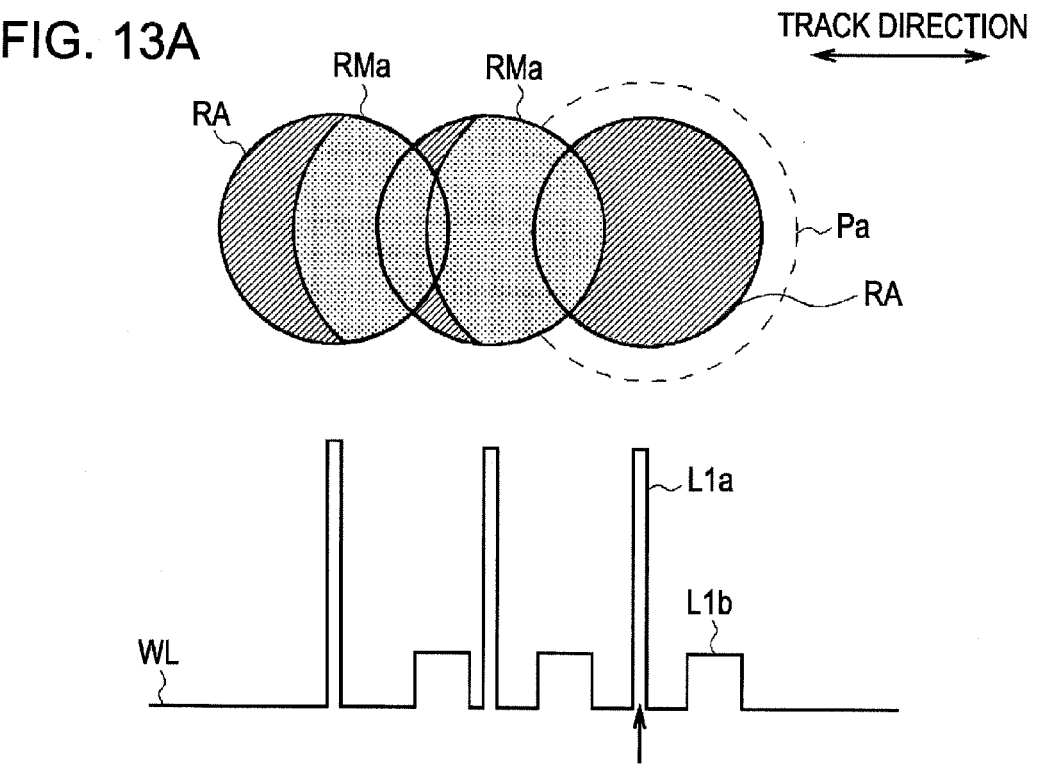
FIGS. 13A and 13B are schematic diagrams illustrating the recording-mark forming operation according to the first embodiment.

Then, as shown in the lower part of FIG. 13A, the recording/reproducing light source 20 emits the recording light beam L1a for the first emission time TMa in a similar manner. Accordingly, the absorption change area RA is formed in the recording layer 101 as a result of the two-photon absorption reaction of the light-absorption change material.

Figure 13B:
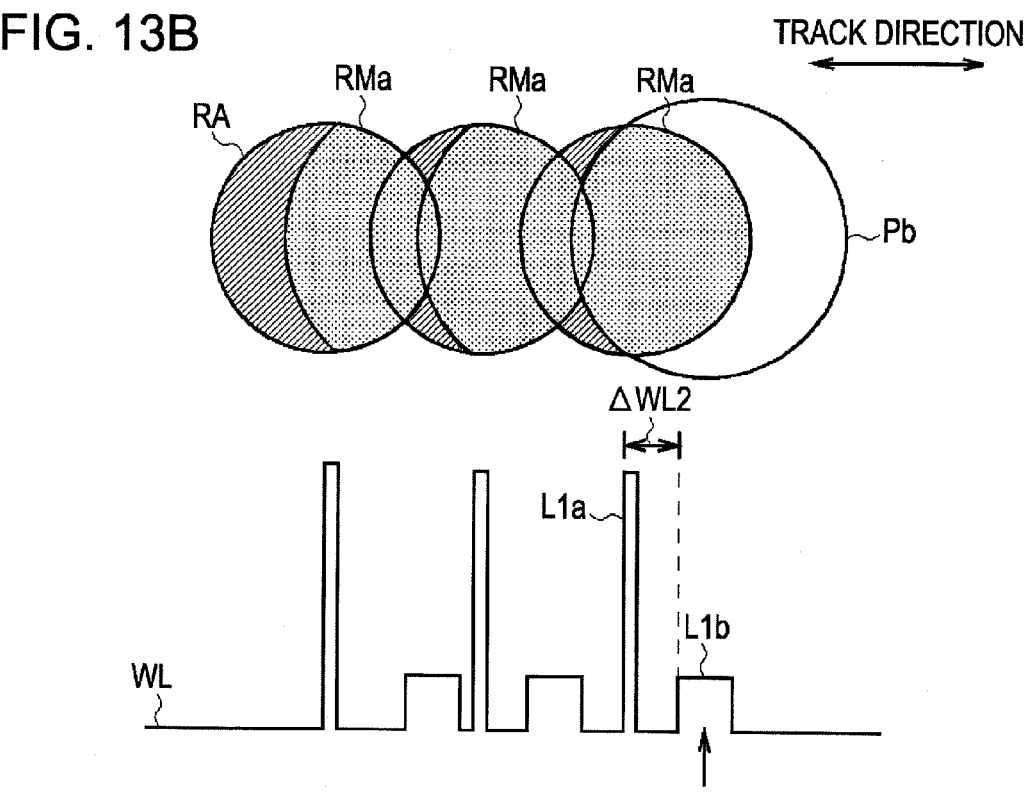

Then, as shown in the lower part of FIG. 13B, when the predetermined emission delay time ΔWL2 elapses after the start of emission of the recording light beam L1a, the recording/reproducing light source 20 emits the recording light beam L1b having the second emission light intensity PPb for the second emission time TMb.

Accordingly, as shown in the upper part of FIG. 13B, the spot Pb can be positioned such that the spot Pb partially overlaps the previously formed recording mark RMa (FIG. 12B), and the recording/reproducing light source 20 can form another recording mark RMa such that the recording marks RMa are connected to each other.

Figure 14:
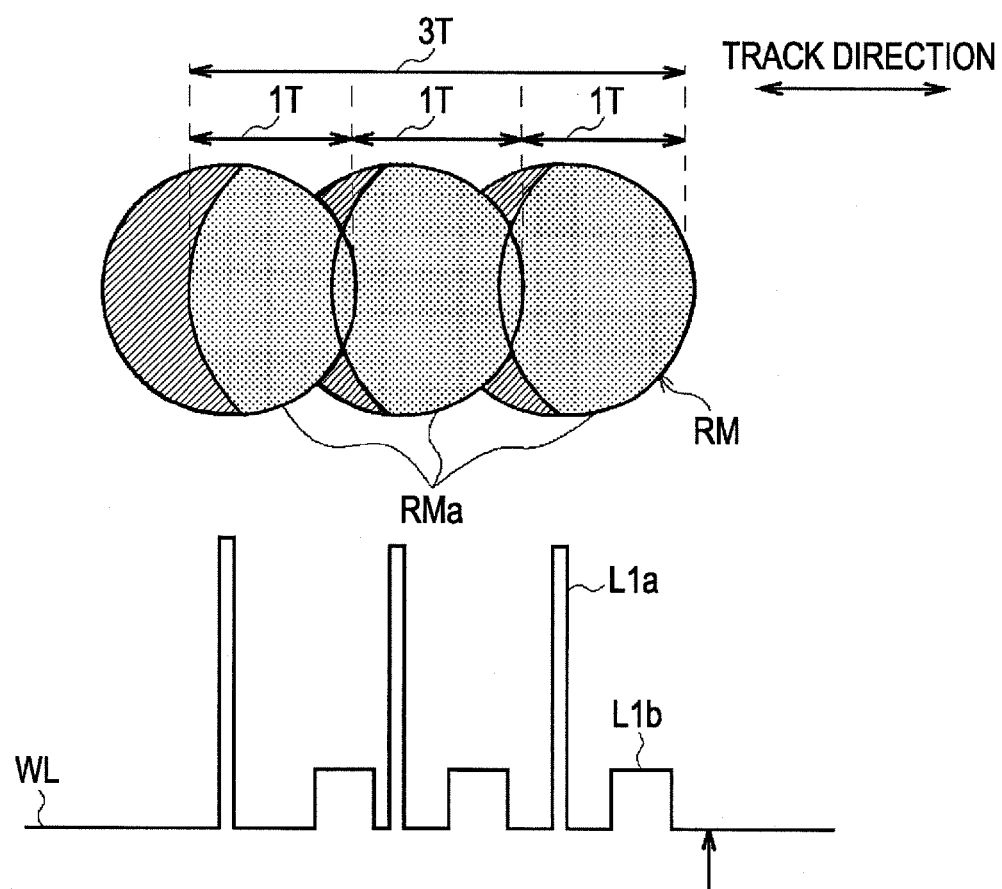
FIG. 14 is a schematic diagram illustrating the recording-mark forming operation according to the first embodiment.

As a result, as shown in the upper part of FIG. 14, the recording/reproducing light source 20 forms the recording marks RMa such that the distance between the front end of the recording mark RMa which has been formed first and the rear end of the recording mark RMa which has been formed last is equal to the mark length 3T.

In practice, as shown in part (C) of FIG. 10, the laser control unit 18 generates the laser driving current Dw including current pulses DPa which correspond to the recording light beam L1a and current pulses DPb which correspond to the recording light beam L1b.

When the laser control unit 18 detects that the recording data Sw is switched from the "low" level to the "high" level, the laser control unit 18 generates a current pulse DPa in synchronization with the falling edge of the recording clock CLw so that the recording light beam L1a having the first emission light intensity PPa is emitted for the first emission time TMa.

Then, the laser control unit 18 generates a current pulse DPb at a time delayed from the falling edge of the recording clock CLw by a current delay time ΔDab1 so that the recording light beam L1b having the second emission light intensity PPb is emitted at a time delayed from the emission of the recording light beam L1a by the emission delay time ΔWL1. At this time, the control unit 18 generates the current pulse DPb such that the recording light beam L1b having the second emission light intensity PPb is emitted for the second emission time TMb.

Then, if the laser control unit 18 detects that the recording data Sw is maintained at the "high" level since the previous recording clock CLw, the laser control unit 18 generates the current pulse DPa in synchronization with the falling edge of the recording clock CLw so that the recording light beam L1a having the first emission light intensity PPa is emitted for the first emission time TMa.

Then, the laser control unit 18 generates the current pulse DPb at a time delayed from the falling edge of the recording clock CLw by a current delay time ΔDab2 so that the recording light beam L1b having the second emission light intensity PPb is emitted at a time delayed from the emission of the recording light beam L1a by the emission delay time ΔWL2.

In other words, the laser control unit 18 repeatedly generates the current pulse DPa and the current pulse DPb while the recording data Sw is at the "high" level. At this time, the laser control unit 18 sets the current delay time between the current pulse DPa and the current pulse DPb to ΔDab1 when the front section of the recording mark RM having a desired mark length is being formed, and sets the current delay time between the current pulse DPa and the current pulse DPb to ΔDab2 when the rear section of the recording mark RM is being formed.

When the laser control unit 18 detects that the recording data Sw is at the "low" level, the laser control unit 18 sets the current value to a predetermined reference value.

Thus, the optical information recording/reproducing apparatus 10 uses the combination of the two-photon absorption reaction and the thermal reaction, and forms the recording mark RM only in an area in which both the two-photon absorption reaction caused by the recording light beam L1a and the thermal reaction caused by the recording light beam L1b occur. As a result, the size of the recording mark RM can be reduced in the track direction.

2-4. Operation and Effects

In the above-described structure, the track TR along which the recording marks RM are linearly arranged is formed in the recording layer 101, and the dimension wt of each recording mark RM which corresponds to the reference mark length 1T, which serves as a reference, in the track direction is smaller than the dimensions wr and we thereof in the radial direction and the thickness direction, respectively, which are two directions perpendicular to the track direction.

Accordingly, in the optical information recording medium 100, the intervals between the recording marks RM in the track direction can be ensured and the crosstalk can be reduced. In addition, in the optical information recording medium 100, the dimension wr of each recording mark RM in the radial direction can be increased, so that the intensity of the returning light beam L3 which returns from the recording mark RM can be increased. As a result, the amplitude of the signal level of the reproduction signal SRF which varies in accordance with the presence or absence of the recording mark RM in the optical information recording medium 100 can be increased. Accordingly, the reproduction characteristics can be improved.

The recording marks RM can be formed in the optical information recording medium 100 by irradiating the optical information recording medium 100 with the recording light beam L1a, which serves as first recording light, to cause the two-photon absorption reaction and then irradiating the optical information recording medium 100 with the recording light beam L1b, which serves as second recording light, after the irradiation with the recording light beam L1a. Each recording mark RM is formed as a result of the thermal reaction caused by the recording light beam L1b in the absorption change area RA, which serves as a change area formed as a result of the two-photon absorption reaction caused by the recording light beam L1a.

Thus, in the optical information recording medium 100, each recording mark RM can be formed such that the dimension wt thereof in the track direction is smaller than the dimensions wr and we thereof in the radial direction and the thickness direction, respectively, by emitting the recording light beam L1a and the recording light beam L1b at positions shifted from each other in the track direction.

In addition, in the optical information recording medium 100, the light absorption characteristics in the absorption change area RA are changed as a result of the two-photon absorption reaction caused by the irradiation with the recording light beam L1a, and then the thermal reaction is caused by the recording light beam L1b.

Therefore, in the optical information recording medium 100, the recording light beam L1b can be efficiently absorbed in the absorption change area RA since the light absorption characteristics are changed in the absorption change area RA, and each recording mark RM can be quickly formed in response to the thermal reaction. In the area outside the absorption change area RA, the recording light beam L1 is hardly absorbed. Therefore, the overall light transmittance of the recording layer 101 can be increased and variation in the intensity of the recording light beam L1 with respect to the depth of the recording layer 101 from the substrate 102 can be reduced.

In addition, in the optical information recording medium 100, the recording mark RM is formed by forming a plurality of recording marks RMa having the mark length that is substantially equal to the reference mark length 1T, so that the mark length of the recording mark RM can be set to an integral multiple of the reference mark length 1T.

Thus, in the optical information recording medium 100, the recording marks RM, each of which has the mark length that is substantially equal to an integral multiple of the reference mark length 1T, can be formed by alternately emitting the recording light beams L1a and L1b. In other words, in the optical information recording medium 100, the recording marks RM can be formed while continuously moving the irradiation position instead of returning the irradiation position to the original position each time the recording light beam L1a or L1b is emitted.

In addition, in the optical information recording medium 100, the adjacent recording marks RMa which each have a mark length that is substantially equal to the reference mark length 1T are formed so as to partially overlap each other at the front and rear ends thereof.

Therefore, in the optical information recording medium 100, the recording marks RMa having the reference mark length 1T can be connected to each other without leaving large gaps therebetween. As a result, the intensity of the returning light beam L3 can be prevented from being reduced at positions between the recording marks RMa having the reference mark length 1T.

The recording layer 101 of the optical information recording medium 100 includes the light-absorption change material which changes the light absorption characteristics thereof in response to the two-photon absorption reaction caused by the irradiation with the recording light beam L1a, and then causes the thermal reaction in response to the irradiation with the recording light beam L1b after the irradiation with the recording light beam L1a. The refractive index of the recording layer 101 is locally changed in response to the thermal reaction.

Therefore, in the recording layer 101, the recording mark RM can be formed by causing the thermal reaction only in the area in which the two-photon absorption reaction has occurred, and then changing the refractive index in the area in which the thermal reaction has occurred.

In addition, the recording layer 101 included in the optical information recording medium 100 is formed by dispersing the light-absorption change material in the binder resin which locally changes the refractive index thereof in response to the thermal reaction. Therefore, the recording mark RM can be formed in the recording layer 101 by changing the refractive index of the binder resin in response to the thermal reaction caused by the light-absorption change material.

In addition, in the optical information recording medium 100, a photochromic material which changes the light absorption characteristics thereof by changing the chemical structure thereof in a reversible manner in response to the irradiation with light is used as the light-absorption change material.

Accordingly, in the optical information recording medium 100, the light absorption characteristics in the absorption change area RA can be dramatically changed in response to the two-photon absorption reaction. Therefore, the recording light beam L1b can be effectively absorbed and the thermal reaction can be efficiently generated.

In addition, in the optical information recording medium 100, the absorption change area RA is formed as a result of the two-photon absorption reaction caused by the irradiation with the recording light beam L1a, and the recording mark RM is formed only in the area in which the thermal reaction is caused in the absorption change area RA by the irradiation with the recording light beam L1b after the irradiation with the recording light beam L1a.

Therefore, in the optical information recording medium 100, the recording mark RM can be formed only in the area in which both the two-photon absorption reaction and the thermal reaction occur. As a result, the shape of the recording mark RM can be adjusted to a desired shape.

The optical information recording/reproducing apparatus 10 irradiates the optical information recording medium 100 with the recording light beam L1 including the recording light beam L1a and the recording light beam L1b. The recording mark RM is formed in the optical information recording medium 100 only in the area in which both the two-photon absorption reaction caused by the irradiation with the recording light beam L1a and the thermal reaction caused by the irradiation with recording light beam L1b occur.

The optical information recording/reproducing apparatus 10 emits the recording light beam L1 such that the focal point P1 of the recording light beam L1 is positioned at the target position PG. More specifically, the optical information recording/reproducing apparatus 10 emits the recording light beam L1a and the recording light beam L1b such that the absorption change area RA, which is the first irradiation area that is irradiated with the recording light beam L1a, and the spot Pb, which is the second irradiation area irradiated with the recording light beam L1b, only partially overlap each other.

Accordingly, the optical information recording/reproducing apparatus 10 is capable of forming the recording mark RM in a desired shape by changing the area in which the absorption change area RA and the spot Pb overlap each other.

The optical information recording/reproducing apparatus 10 rotates the optical information recording medium 100 with the spindle motor 15, which functions as a position adjusting member, and thereby forms tracks TR in the optical information recording medium 100 in a spiral or concentric pattern.

The optical information recording/reproducing apparatus 10 emits the recording light beam L1a and the recording light beam L1b such that the times at which the recording light beams L1a and L1b are emitted are shifted from each other by a certain delay time $\Delta WL1$, which is the first irradiation delay time. As a result, the absorption change area RA irradiated with the recording light beam L1a and the spot Pb irradiated with the recording light beam L1b overlap each other in the track direction in which the track TR extends.

Thus, in the optical information recording/reproducing apparatus 10, the absorption change area RA and the spot Pb can be positioned so as to overlap each other by a simple process of shifting the times at which the recording light beams L1a and L1b are emitted from each other.

In addition, the optical information recording/reproducing apparatus 10 forms the recording mark RMa having a mark length substantially equal to the reference mark length 1T by positioning the absorption change area RA irradiated with the recording light beam L1a and the spot Pb irradiated with the recording light beam L1b such that the absorption change area RA and the spot Pb only partially overlap each other. Then, the recording mark RM having a mark length that is an integral multiple of the reference mark length 1T is formed by forming a plurality of recording marks RMa which each have a mark length substantially equal to the reference mark length 1T such that the recording marks RMa partially overlap each other.

In the information recording/reproducing apparatus 10, in the process of forming the recording mark RM having a mark length equal to an integral multiple of the reference mark length 1T, a first recording mark RMa is formed in a mark length substantially equal to the reference mark length 1T and the following recording marks RMa other than the first recording mark are formed in a mark length longer than the reference mark length 1T by an amount corresponding to the amount by which the recording marks RMa overlap each other.

According to the optical information recording/reproducing apparatus 10, the recording marks RMa having the reference mark length 1T overlap each other so as to cancel the amount by which the mark length of the recording marks RMa are increased. Therefore, the recording mark RM having a mark length that is substantially equal to an integral multiple of the reference mark length 1T can be formed.

The optical information recording/reproducing apparatus 10 emits both the recording light beam L1a and the recording light beam L1b from the recording/reproducing light source 20. Thus, the optical information recording/reproducing apparatus 10 includes only one light source. Therefore, the shape of the recording mark RM can be controlled without making the structure of the optical pickup 17 complex.

In the above-described structure, the recording light beam L1a is emitted toward the optical information recording medium 100. The recording mark RM can be formed in the optical information recording medium 100 only in the area in which both the two-photon absorption reaction caused by the recording light beam L1a and the thermal reaction caused by the recording light beam L1b occur. Then, the optical information recording/reproducing apparatus 10 emits the recording light beam L1b such that the absorption change area RA irradiated with the recording light beam L1a and the spot Pb irradiated with the recording light beam L1b only partially overlap each other.

According to the embodiment of the present invention, the dimension of the recording mark RM in the track direction can be reduced by suitably changing the manner in which the absorption change area RA and the spot Pb overlap each other. Therefore, a large number of recording marks RM can be arranged in the track direction. Thus, according to the embodiment of the present invention, an optical information recording medium, an optical information recording apparatus, and an optical information recording method capable of increasing the recording capacity are provided.

3. Second Embodiment

FIGS. 15 to 18B are diagrams illustrating the second embodiment of the present invention. In FIGS. 15 to 18B, components similar to those of the first embodiment shown in FIGS. 1 to 14 are denoted by the same reference numerals. In an optical information recording/reproducing apparatus 110 according to the second embodiment, the structure of an optical pickup 117 differs from that of the optical pickup 17.

3-1. Structure of Optical Pickup

The optical pickup 117 included in the optical information recording/reproducing apparatus 110 of the present embodiment includes a red light source 60 and a blue light source 65 as light sources. In an information recording process, both a red light beam LR having a wavelength of 780 [nm] and a blue light beam LB having a wavelength of 405 [nm] are used as the recording light beam L1. In an information reproducing process, the blue light beam LB is used as the reading light beam L2.

Figure 15:
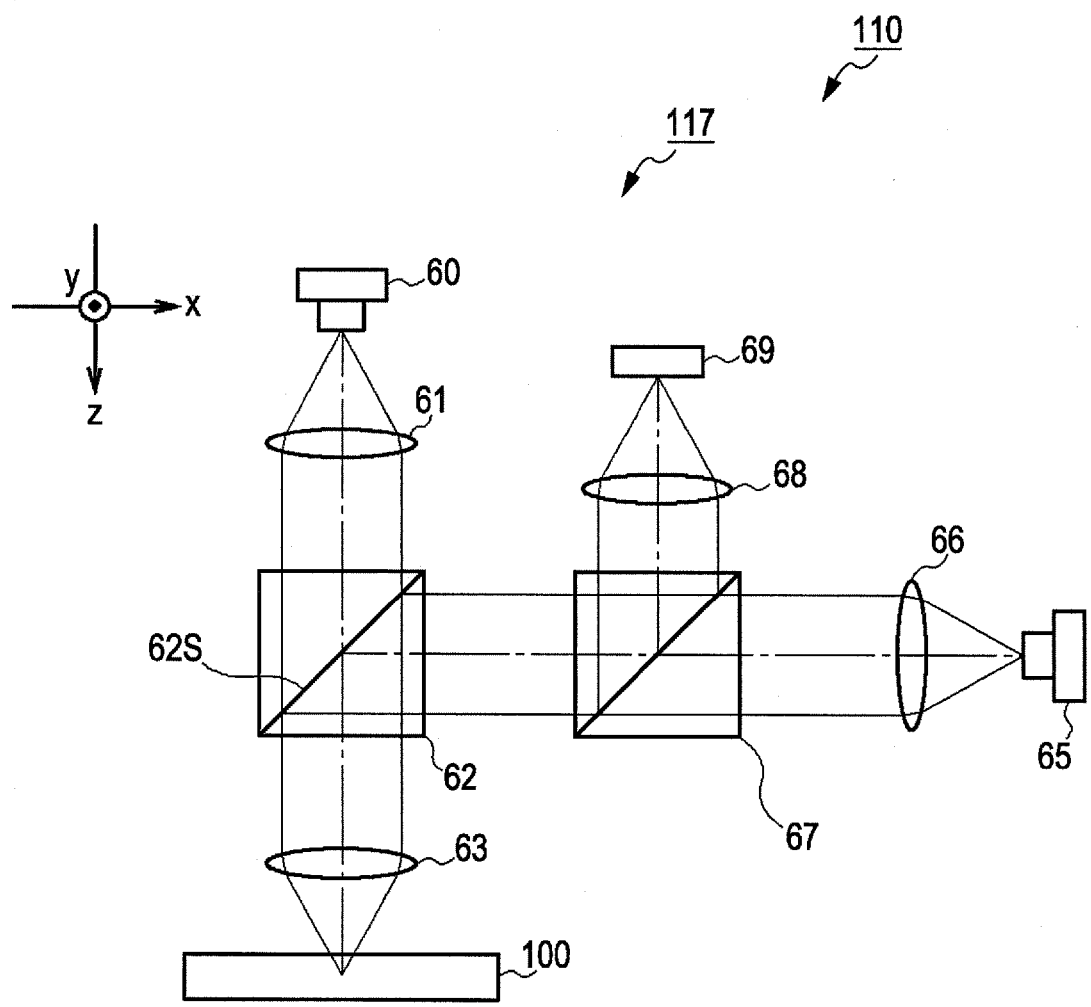
FIG. 15 is a schematic diagram illustrating the structure of an optical pickup according to a second embodiment.

As shown in FIG. 15, the optical pickup 117 causes the red light source 60 to emit the red light beam LR with a wavelength of 780 [nm] under the control of the control unit 11. The thus-emitted red light beam LR is converted from divergent light to collimated light by a collimator lens 61 and is incident on a dichroic prism 62.

The dichroic prism 62 includes a reflective-transmissive surface 62S which reflects or transmits a light beam in accordance with a wavelength thereof. When the red light beam LR is incident on the reflective-transmissive surface 62S, the reflective-transmissive surface 62S transmits the red light beam LR so that the red light beam LR is incident on an objective lens 63. The objective lens 63 converges the red light beam LR such that the red light beam LR is focused on the target position PG in the optical information recording medium 100.

As shown in FIG. 15, the optical pickup 117 also causes the blue light source 65 to emit the blue light beam LB with a wavelength of 405 [nm] under the control of the control unit 11. The thus-emitted blue light beam LB is converted from divergent light to collimated light by a collimator lens 66 and is incident on a beam splitter 67.

The beam splitter 67 transmits the blue light beam LB at a predetermined ratio and causes the blue light beam LB to be incident on the dichroic prism 62.

The dichroic prism 62 reflects the blue light beam LB with the reflective-transmissive surface 62S and causes the blue light beam LB to be incident on the objective lens 63. The objective lens 63 converges the blue light beam LB such that the blue light beam LB is focused on the target position PG in the optical information recording medium 100.

If the recording mark RM is formed in the optical information recording medium 100 at the target position PG, the blue light beam LB used in the information reproducing process is reflected due to the difference in the refractive index between the recording mark RM and the surrounding area in the recording layer 101. As a result, the returning light beam L3 is generated. If the recording mark RM is not formed in the optical information recording medium 100 at the focus position of the blue light beam LB, the blue light beam LB passes through the optical information recording medium 100. Therefore, the returning light beam L3 is hardly generated.

If the returning light beam L3 returns from the optical information recording medium 100, the returning light beam L3 is converted into collimated light by the objective lens 63 and is incident on the dichroic prism 62. Then, the dichroic prism 62 reflects the returning light beam L3 with the reflective-transmissive surface 62S and causes the returning light beam L3 to be incident on the beam splitter 67.

A part of the returning light beam L3 is reflected by the beam splitter 67, is incident on and focused by a condenser lens 68, and is incident on the light receiving element 69.

The light receiving element 69 detects the intensity of the returning light beam L3, generates a detection signal corresponding to the intensity of the returning light beam L3, and outputs the detection signal to the control unit 11. Thus, the control unit 11 can recognize the state of detection of the returning light beam L3 on the basis of the detection signal.

As described above, the optical information recording/reproducing apparatus 110 uses both the red light beam LR and the blue light beam LB in the information recording process, and uses only the blue light beam LB in the information reproducing process. Thus, the information can be recorded in or reproduced from the optical information recording medium 100.

3-2. Information Recording Process

Figure 16:
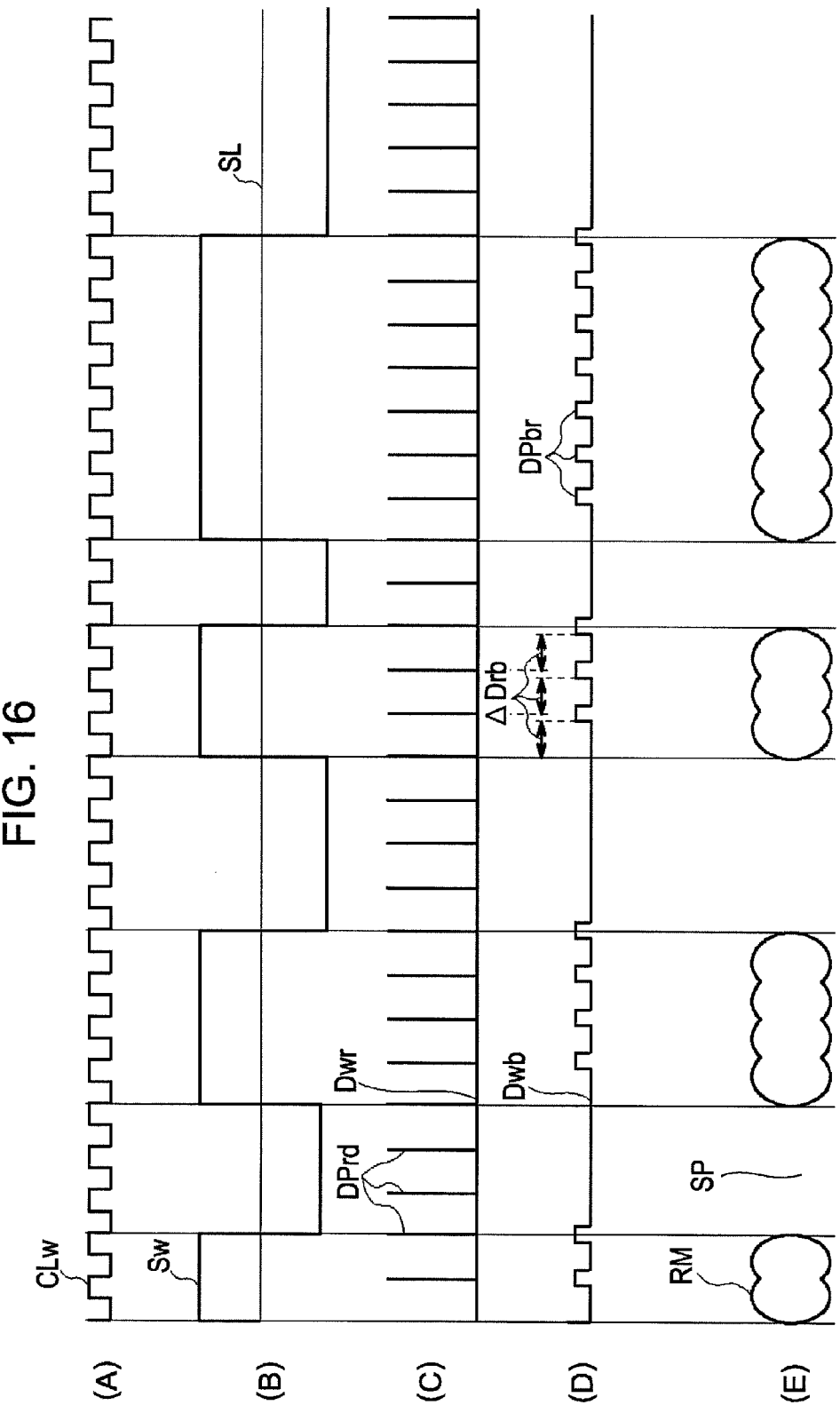
FIG. 16 is a schematic diagram illustrating an information recording process according to the second embodiment.

As shown in FIG. 16, a laser control unit 120 (see FIG. 8), which corresponds to the laser control unit 18, generates a red laser driving current Dwr to be supplied to the red light source 60 and a blue laser driving current Dwb to be supplied to the blue light source 65 as the laser driving currents Dw.

The laser control unit 120 emits the red light beam LR as the recording light beam L1a and the blue light beam LB as the recording light beam L1b.

As an example, a case in which a recording mark RM having a mark length 3T, which is three times as long as the reference mark length 1T, is formed will be described with reference to FIGS. 17A to 18B, which correspond to FIGS. 11A to 14.

Figure 17A:
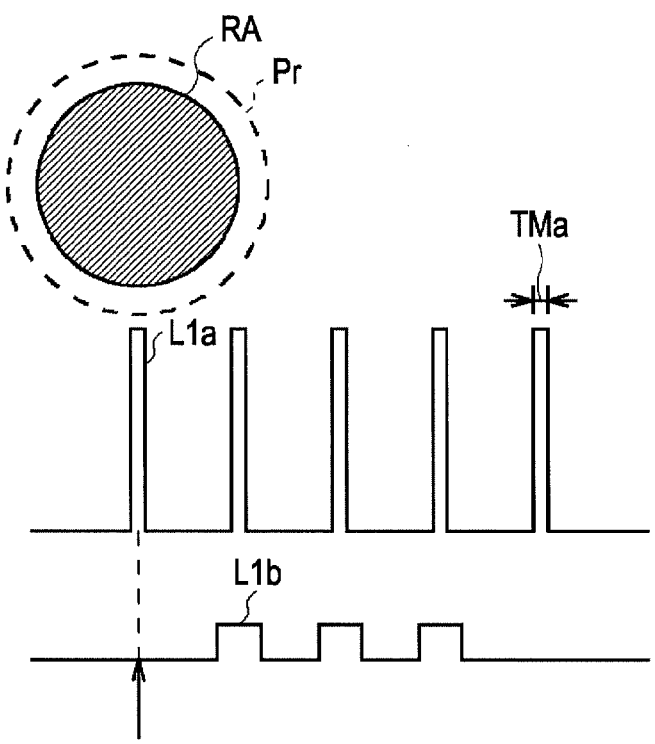
FIGS. 17A and 17B are schematic diagrams illustrating a recording-mark forming operation according to the second embodiment.

As shown in the lower part of FIG. 17A, the red light source 60 emits the recording light beam L1a having a first emission light intensity PPa, which is relatively high, for a first emission time TMa. As a result, as shown in the upper part of FIG. 17A, the absorption change area RA having a diameter da smaller than the diameter d is formed in the recording layer 101 at a position near the focal point FL1a of the recording light beam L1a as a result of the two-photon absorption reaction of the light-absorption change material.

Figure 17B:
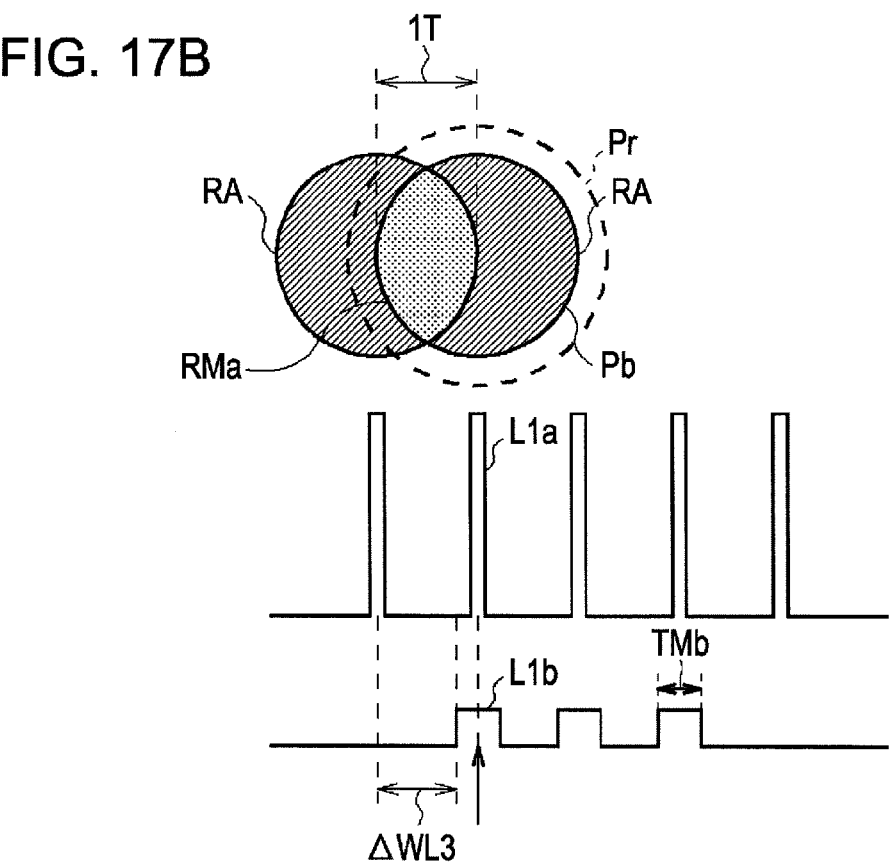

Then, as shown in the lower part of FIG. 17B, when a predetermined emission delay time $\Delta WL3$ elapses after the start of emission of the recording light beam L1a, the blue light source 65 emits the recording light beam L1b having a second emission light intensity PPb, which is relatively low, for a second emission time TMb, which is longer than the first emission time TMa.

As a result, as shown in the upper part of FIG. 17B, the spot Pb of the recording light beam L1b emitted from the blue light source 65 can be placed at a position shifted from the absorption change area RA by a distance corresponding to the emission delay time $\Delta WL3$. Accordingly, as shown in the upper part of FIG. 17B, the blue light source 65 can form the recording mark RM only in an area in which the spot Pb and the absorption change area RA overlap each other. Thus, the recording mark RMa having the reference mark length 1T can be formed.

The wavelength $\lambda$ of the recording light beam L1b is 405 [nm], and the wavelength $\lambda_r$ of the recording light beam L1a is 780 [nm]. Therefore, the spots Pr and Pb formed by the recording light beams L1a and L1b have different diameters. FIGS. 17A and 17B show the case in which the absorption change area RA and the spot Pb have substantially the same size.

Then, as shown in the lower part of FIG. 17B, the blue light source 65 emits the recording light beam L1b for the second emission time TMb. As a result, as shown in the upper part of FIG. 17B, the absorption change area RA is formed by the blue light source 65.

The recording light beams L1a and L1b are emitted from different light sources, that is, from the red light source 60 and the blue light source 65. Therefore, the recording light beams L1a and L1b can be emitted at the same time. In other words, the red light source 60 and the blue light source 65 are capable of forming the recording mark RMa as a result of the thermal reaction and the absorption change area RA as a result of the two-photon absorption reaction at substantially the same time.

Figure 18A:
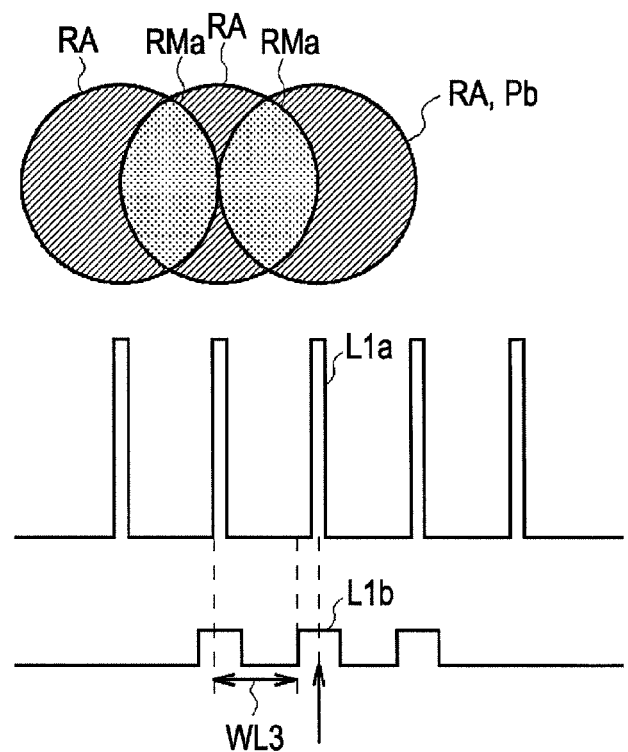
FIGS. 18A and 18B are schematic diagrams illustrating the recording-mark forming operation according to the second embodiment.

Then, as shown in the lower part of FIG. 18A, the blue light source 65 emits the recording light beam L1b for the second emission time TMb in a similar manner. In addition, the red light source 60 emits the recording light beam L1a for the first emission time TMa. Accordingly, the recording mark RMa is formed in the recording layer 101 as a result of the thermal reaction, and the absorption change area RA is also formed in the recording layer 101 as a result of the two-photon absorption reaction.

Figure 18B:
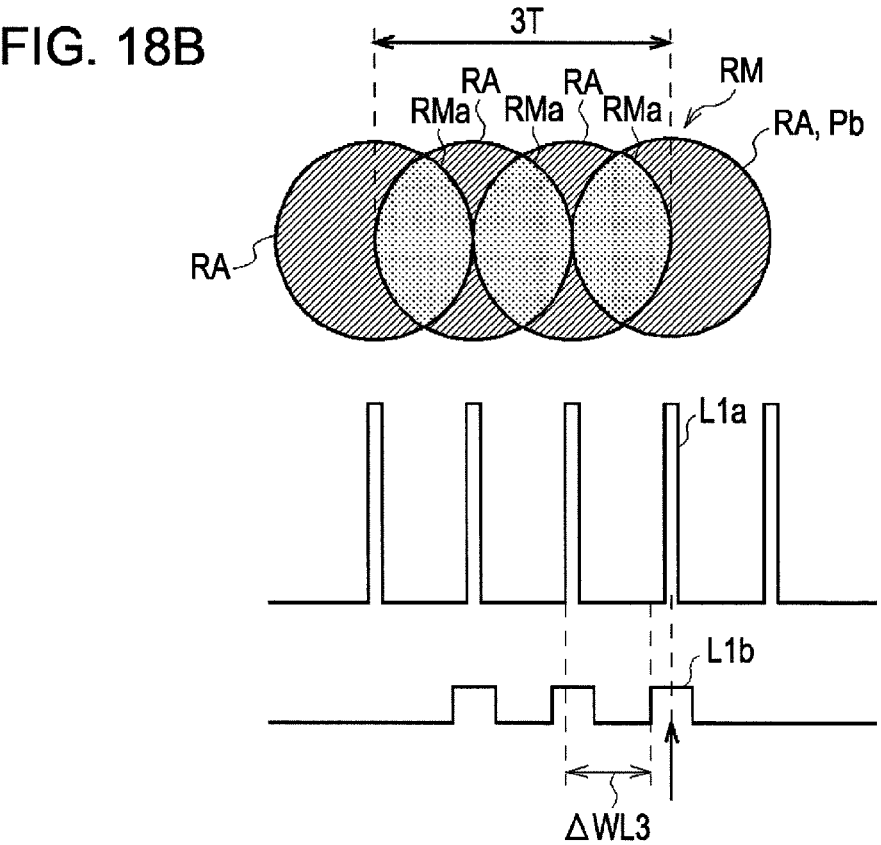

Then, as shown in the lower part of FIG. 18B, the blue light source 65 emits the recording light beam L1b for the second emission time TMb in a similar manner. In addition, the red light source 60 emits the recording light beam L1a for the first emission time TMa. Accordingly, the recording mark RMa is formed in the recording layer 101 as a result of the thermal reaction, and the absorption change area RA is also formed in the recording layer 101 as a result of the two-photon absorption reaction.

Thus, as shown in the upper part of FIG. 18B, the red light source 60 and the blue light source 65 form the recording marks RMa such that the recording marks RMa abut on each other and such that the distance between the front end of the recording mark RMa which has been formed first and the rear end of the recording mark RMa which has been formed last is equal to the mark length 3T.

In practice, as shown in parts (C) and (D) of FIG. 16, the laser control unit 120 generates the red laser driving current Dwr to be supplied to the red light source 60 and the blue laser driving current Dwb to be supplied to the blue light source 65.

The laser control unit 120 generates a current pulse DPrd as the red laser driving current Dwr at a predetermined period in synchronization with the falling edge of the recording clock CLw, so that the recording light beam L1a having the first emission light intensity PPa is emitted for the first emission time TMa.

When the laser control unit 120 detects that the recording data Sw is at the "high" level, the laser control unit 120 generates a current pulse DPbr at a time delayed from the falling edge of the recording clock CLw by a current delay time ADrb so that the recording light beam L1b having the second emission light intensity PPb is emitted at a time delayed from the emission of the recording light beam L1a by the emission delay time $\Delta WL3$. At this time, the laser control unit 120 generates a current pulse DPbr such that the recording light beam L1b having the second emission light intensity PPb is emitted for the second emission time TMb.

When the laser control unit 120 detects that the recording data Sw is at the "low" level, the laser control unit 120 sets the current value to a predetermined reference value.

As described above, the optical information recording/reproducing apparatus 110 includes the red light source 60 and the blue light source 65, and therefore the times at which the recording light beams L1a and L1b are emitted can be optionally set independently of each other. As a result, the recording mark RM having a desired shape can be formed.

3-3. Operation and Effects

In the above-described structure, the optical information recording/reproducing apparatus 110 forms the absorption change area RA irradiated with the recording light beam L1a and the spot Pb irradiated with the recording light beam L1b such that the absorption change area RA and the spot Pb only partially overlap each other. Accordingly, the optical information recording/reproducing apparatus 110 forms a plurality of recording marks RMa which each have a mark length that is substantially equal to the reference mark length 1T such that the recording marks RMa abut on each other. Thus, the recording mark RM having a mark length that is equal to an integral multiple of the reference mark length 1T can be formed.

Thus, the optical information recording/reproducing apparatus 110 can form the recording mark RM simply by repeatedly emitting the recording light beam L1b at a time shifted by the emission delay time $\Delta WL3$ from the emission of the recording light beam L1a. Thus, the processing load on the laser control unit 120 can be reduced.

The optical information recording/reproducing apparatus 110 includes the red light source 60 which serves as the first light source for emitting the recording light beam L1a and the blue light source 65 which serves as the second light source for emitting the recording light beam L1b.

Therefore, in the optical information recording/reproducing apparatus 110, the recording light beams L1a and L1b can be emitted at the same time. Accordingly, the limitations on the times at which the recording light beams L1a and L1b are emitted can be reduced. As a result, the shape of the recording marks RM can be more freely adjusted.

In the optical information recording/reproducing apparatus 110 emits, the recording light beam L1a is periodically emitted at a certain time period, and the recording light beam L1b is emitted in accordance with the information.

Thus, in the optical information recording/reproducing apparatus 110, the recording light beam L1a can be constantly emitted irrespective of the information. Therefore, compared to the method in which the recording light beam L1a is quickly emitted in accordance with the information, the processing load on the laser control unit 120 can be reduced.

In addition, in the optical information recording/reproducing apparatus 110, the recording light beam L1a, which has a longer wavelength than that of the recording light beam L1b, is emitted from the red light source 60 and the reading light beam L2, of which the emission light intensity is smaller than that of the recording light beam L1b, is emitted from the blue light source 65 in the information reproducing process.

Accordingly, in the optical information recording/reproducing apparatus 110, the spot diameter d of the reading light beam L2 can be reduced in accordance with the dimension wt of the recording mark RM in the track direction so as to reduce the crosstalk. Therefore, information can be recorded in the optical information recording medium 100 at a recording density corresponding to the size of the recording mark RM in the track direction. As a result, the recording capacity of the optical information recording medium 100 can be increased.

In addition, in the optical information recording/reproducing apparatus 110, the spot diameter d of the reading light beam L2 is reduced in accordance with the size of the recording mark RM. Therefore, in the case where the recording mark RM is present at the target position PG, the recording mark RM at the spot Pb can be irradiated with substantially all of the reading light beam L2. As a result, the crosstalk can be effectively reduced and the reproduction characteristics can be improved.

With the above-described structure, according to the embodiment of the present invention, two light sources are used to emit two recording light beams L1a and L1b having different wavelengths. Therefore, the emission times of the recording light beams L1a and L1b can be more freely determined and the shape of the recording mark RM can be more freely controlled.

4. Other Embodiments

According to the above-described first and second embodiments, the light absorption characteristics in the absorption change area RA is changed in response to the two-photon absorption reaction. However, the present invention is not limited to this, and the state of the change area may be set to a high-temperature state in response to heat generated by the two-photon absorption reaction, and then the recording mark RM may be formed by causing a further thermal reaction in the change area. Alternatively, the absorption change area RA may also be formed as a result of photopolymerization caused by the two-photon absorption reaction. Also in this case, effects similar to those obtained by the above-described embodiments can be obtained.

In addition, in the above-described first and second embodiments, each recording mark RM having a mark length that is equal to an integral multiple of the reference mark length 1T is formed by forming a plurality of recording marks RMa which each have the reference mark length 1T. However, the present invention is not limited to this, and the recording mark RM may also be formed in a continuous form such that the mark length thereof is equal to an integral multiple of the reference mark length 1T. In such a case, according to an embodiment of the present invention, first, the recording light beam L1 is emitted for a time corresponding to the mark length. Then, the irradiation position is returned, and the recording light beam L1b is emitted for a time corresponding to the mark length. Alternatively, the optical information recording medium may be subjected to the irradiation with the recording light beam L1a according to the second embodiment as a preformatting process, and thus the absorption change area RA may be formed in advance.

In addition, according to the above-described first and second embodiments, the recording light beams L1a and L1b are emitted such that the absorption change area RA and the spot Pb partially overlap each other by controlling the laser driving current Dw with the laser control unit 18 or by controlling the red laser driving current Dwr and the blue laser driving current Dwb with the laser control unit 120. However, the present invention is not limited to this, and a light-intensity adjusting element which controls the intensity of light by blocking the light may be disposed upstream of the objective lens 23 or 63.

In the first embodiment, various resin materials are mentioned as materials that can be used as the binder resin. However, the present invention is not limited to the above-mentioned materials, and various additives or sensitizing dyes, such as cyanine dyes, coumarin dyes, and quinoline dyes, may also be added as necessary.

In addition, in the above-described first and second embodiments, the recording light beam L1 and the reading light beam L2 are incident on the optical information recording medium 100 at the substrate-102 side. However, the present invention is not limited to this, and the recording light beam L1, for example, may also be incident on the optical information recording medium 100 at the substrate-103 side. Thus, the light or the light beams may either be incident on the optical information recording medium 100 at one of the two sides or at both sides of the optical information recording medium 100. A method for causing the recording light beams to be incident on the medium at both sides thereof is described in, for example, Japanese Unexamined Patent Application Publication No. 2008-71433.

In the first and second embodiments, servo control for controlling the objective lenses 23 and 63 is not particularly described. As described in, for example, Japanese Unexamined Patent Application Publication No. 2008-71433, the servo control may be performed by irradiating a servo layer with a servo light beam for the servo control. Alternatively, servo marks for the servo control may be formed in the recording layer 101 in advance, and the servo control may be performed using the servo marks. In this case, it is not necessary to form the servo layer in the optical information recording medium 100.

In addition, according to the above-described first and second embodiments, each recording mark RM is formed as a hollow section. However, the present invention is not limited to this, and each recording mark RM may also be formed by locally changing the refractive index by causing, for example, a chemical reaction.

In addition, according to the above-described first and second embodiments, the laser control units 18 and 120 are provided separately from the optical pickups 17 and 117, respectively. However, the present invention is not limited to this, and the laser control units 18 and 120 may also be disposed in the optical pickups 17 and 117, respectively.

In addition, in the above-described second embodiment, the wavelength of the reading light beam L2 is shorter than the wavelength of the recording light beam L1. However, the present invention is not limited to this. For example, the spot diameter d can be changed while using the recording light beam L1 and the reading light beam L2 having the same wavelength by selectively using two objective lenses having different numerical apertures.

In addition, in the above-described first embodiment, the wavelength of the recording light beam L1 and the reading light beam L2 emitted from the recording/reproducing light source 20 may be set to a wavelength other than 405 [nm] as long as the recording mark RM can be adequately formed in the recording layer 101 at a position near the target position PG.

In addition, according to the above-described embodiments, the optical information recording medium 100 is disc-shaped and a plurality of recording marks RM are formed next to each other in a concentric or spiral pattern while the optical information recording medium 100 is being rotated. However, the present invention is not limited to this, and the optical information recording medium may be formed in a rectangular or square shape and be moved on a stage. In addition, the position of the optical information recording medium may be fixed and the objective lens may be moved. To provide an optical information recording medium 100 having a recording capacity that is larger than that of a double-layer BD, which has a recording capacity of 250 GB, by a factor of 5 or more, the thickness of the recording layer 101 is preferably equal to or larger than 100 [μm].

In addition, a light receiving element which receives a part of the reading light beam L2 that passes through the optical information recording medium instead of the returning light beam L3 may be provided. In this case, the information can be reproduced on the basis of optical modulation of the reading light beam L2 by detecting the optical modulation of the reading light beam L2 which corresponds to the presence or absence of the recording mark RM. In the case where the desired strength can be provided by the recording layer 101 itself, it is not necessary to provide the substrates 102 and 103 in the optical information recording medium 100.

In addition, in the above-described first and second embodiments, the wavelength of the recording light beam L1 may be set to a wavelength other than 405 [nm] or 780 [nm] as long as the recording mark RM can be adequately formed in the recording layer 101 at a position near the target position PG. In addition, the wavelength of the recording light beam L1a may be shorter than the wavelength of the recording light beam L1b.

In addition, according to the above-described first and second embodiments, the first emission light intensity PPa and the second emission light intensity PPb are different from each other. However, the present invention is not limited to this, and the first emission light intensity PPa and the second emission light intensity PPb may also be equal to each other.

In addition, according to the above-described first and second embodiments, the cases in which recording marks RM having mark lengths of 2T to 11T are formed are described. However, the present invention is not limited to this, and the recording marks RM may also be formed in mark lengths other than 2T to 11T.

In addition, according to the above-described first and second embodiments, the optical information recording/reproducing apparatuses 10 and 110 function to record information in the optical information recording medium 100 or reproduce information from the optical information recording medium 100. However, the present invention is not limited to this, and the optical information recording/reproducing apparatus may also be an optical information recording apparatus which performs only the process of recording information in the optical information recording medium 100.

In addition, the structures according to the first and second embodiments can, of course, be adequately combined as necessary.

In addition, in the above-described embodiments, the optical information recording medium 100, which functions as an optical information recording medium, includes the recording layer 101, which functions as a recording layer. However, the present invention is not limited to this, and the optical information recording medium may also include various other types of recording layers.

In addition, in the above-described embodiments, the optical information recording/reproducing apparatus 10, which functions as an information recording apparatus, includes the objective lens 23, which functions as a light emission unit, the spindle motor 15, which functions as a position controller, and the laser control unit, which functions as an irradiation control unit. However, the present invention is not limited to this, and the optical information recording apparatus according to an embodiment of the present invention may include various other types of light emission units, position control units, and irradiation control units.

The present application contains subject matter related to that disclosed in Japanese Priority Patent Application JP 2008-214402 filed in the Japan Patent Office on Aug. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording medium comprising:
 a recording layer in which a track is formed, the track having recording marks linearly arranged thereon,
 wherein each recording mark has a dimension corresponding to a reference mark length, which serves as a reference, in a track direction along which the track extends, the dimension being smaller than dimensions of the recording mark in two directions perpendicular to the track direction;
 wherein each recording mark is formed as a result of a two-photon absorption reaction caused by first irradiation with first recording light and a thermal reaction caused by second irradiation with second recording light after the first irradiation with the first recording light, the thermal reaction being caused in a change area generated by the two-photon absorption reaction caused by the first irradiation with the first recording light.

2. The optical information recording medium according to claim 1,
 wherein light absorption characteristics of the recording layer in the change area are changed as a result of the two-photon absorption reaction caused by the irradiation with the first recording light prior to the thermal reaction being caused by the irradiation with the second recording light.

3. The optical information recording medium according to claim 1,
wherein each recording mark is formed such that a mark length of the recording mark is equal to an integral multiple of the reference mark length by forming a plurality of recording marks which each have a mark length substantially equal to the reference mark length.

4. The optical information recording medium according to claim 3,
wherein each recording mark is formed by forming the plurality of recording marks which each have the mark length substantially equal to the reference mark length such that the adjacent recording marks abut each other or partially overlap each other at front and rear ends thereof.

5. An optical information recording medium comprising:
a recording layer containing a light-absorption change material which changes light absorption characteristics of the recording layer in response to a two-photon absorption reaction caused by first irradiation with first recording light and causes a thermal reaction in response to second irradiation with second recording light after the first irradiation with the first recording light, a refractive index of the recording layer being locally changed in response to the thermal reaction;
wherein each recording mark is formed as a result of a two-photon absorption reaction caused by first irradiation with first recording light and a thermal reaction caused by second irradiation with second recording light after the first irradiation with the first recording light, the thermal reaction being caused in a change area generated by the two-photon absorption reaction caused by the first irradiation with the first recording light.

6. The optical information recording medium according to claim 5,
wherein the recording layer is obtained by dispersing the light-absorption change material in a binder resin which locally changes the refractive index in response to the thermal reaction.

7. The optical information recording medium according to claim 5,
wherein the light-absorption change material is a photochromic material which changes the light absorption characteristics by changing a chemical structure of the photochromic material in a reversible manner in response to irradiation with light.

8. An optical information recording medium in which a recording mark is formed only in an area in which a thermal reaction is caused in a change area formed as a result of a two-photon absorption reaction caused by first irradiation with first recording light, the thermal reaction being caused by second irradiation with second recording light after the first irradiation with the first recording light;
wherein each recording mark is formed as a result of a two-photon absorption reaction caused by first irradiation with first recording light and a thermal reaction caused by second irradiation with second recording light after the first irradiation with the first recording light, the thermal reaction being caused in a change area generated by the two-photon absorption reaction caused by the first irradiation with the first recording light.

9. An optical information recording apparatus comprising:
a light source which emits recording light;
a light emitting unit which irradiates an optical information recording medium with the recording light, the recording light including first recording light and second recording light emitted after the first recording light, a recording mark being formed in the optical information recording medium only in an area in which both a two-photon absorption reaction caused by first irradiation with the first recording light and a thermal reaction caused by second irradiation with the second recording light occur;
a position adjusting unit which positions a focal point of the recording light emitted from the light emitting unit at a desired target position; and
an irradiation control unit which controls the irradiation with the first recording light and the second recording light such that a change area irradiated with the first recording light and an irradiation area irradiated with the second recording light only partially overlap each other;
wherein the light source emits both the first recording light and the second recording light.

10. The optical information recording apparatus according to claim 9,
wherein the position adjusting unit rotates the optical information recording medium so that a track is formed in the optical information recording medium in a spiral or concentric pattern.

11. The optical information recording apparatus according to claim 10,
wherein the irradiation control unit controls the irradiation with the first recording light and the second recording light such that the change area irradiated with the first recording light and the irradiation area irradiated with the second recording light only partially overlap each other to thereby form a recording mark having a mark length substantially equal to a reference mark length, and
wherein a recording mark having a mark length equal to an integral multiple of the reference mark length is formed by forming a plurality of recording marks having a mark length substantially equal to the reference mark length such that the recording marks abut each other.

12. The optical information recording apparatus according to claim 9, wherein the light source includes
a first light source which emits the first recording light, and
a second light source which emits the second recording light.

13. The optical information recording apparatus according to claim 12,
wherein the second light source emits the second recording light with a wavelength different from a wavelength of the first recording light, and
wherein the second light source emits reading light having an emission light intensity that is smaller than an emission light intensity of the second recording light in an information reading process.

* * * * *